US012693833B1

(12) United States Patent
Vorganti et al.

(10) Patent No.: US 12,693,833 B1
(45) Date of Patent: Jul. 28, 2026

(54) CORE AGENT FOR GENERATION OF LEGACY INFRASTRUCTURE MODERNIZATION INTELLIGENCE MODELS

(71) Applicant: American International Group, Inc., New York, NY (US)

(72) Inventors: Surya Vorganti, Charlotte, NC (US); Kevin Ben Hicks, Davidson, NC (US); Radhakrishnan Ramachandran, Manalapan, NJ (US)

(73) Assignee: AMERICAN INTERNATIONAL GROUP, INC., New York, NY (US)

( * ) Notice: Subject to any disclaimer, the term of this patent is extended or adjusted under 35 U.S.C. 154(b) by 0 days.

(21) Appl. No.: 19/231,398

(22) Filed: Jun. 6, 2025

(51) Int. Cl.
*G06F 8/30* (2018.01)
*G06F 8/73* (2018.01)

(52) U.S. Cl.
CPC . *G06F 8/30* (2013.01); *G06F 8/73* (2013.01)

(58) Field of Classification Search
CPC ..................................... G06F 8/30; G06F 8/73
USPC .......................................................... 717/106
See application file for complete search history.

(56) References Cited

U.S. PATENT DOCUMENTS

| | | | | |
|---|---|---|---|---|
| 10,997,461 B2 * | 5/2021 | Elluswamy | .......... | G05D 1/0221 |
| 11,336,539 B2 * | 5/2022 | Rath | ........................ | G06F 18/22 |
| 12,008,341 B2 * | 6/2024 | Chen | ......................... | G06F 8/33 |
| 12,111,859 B2 * | 10/2024 | Siebel | ..................... | G06N 3/045 |
| 2014/0282444 A1 * | 9/2014 | Araya | ........................ | G06F 8/42 |
| | | | | 717/143 |
| 2023/0393870 A1 * | 12/2023 | Singh | ..................... | G06N 20/00 |
| 2024/0202221 A1 * | 6/2024 | Siebel | ..................... | G06N 3/092 |
| 2024/0256852 A1 * | 8/2024 | Yuan | ........................ | G06N 3/08 |

* cited by examiner

*Primary Examiner* — Wei Y Mui
*Assistant Examiner* — Amir Soltanzadeh
(74) *Attorney, Agent, or Firm* — Foley & Lardner LLP

(57) ABSTRACT

A system for training language models to describe, analyze, support, and/or generate code for legacy systems or technology. A data scraper is directed to repositories, logging systems, and databases of legacy systems. Listeners are added to the user interfaces of the legacy systems to capture events, the functions called by the event, and other events occurring at approximately the same time. Chunks for training language models are generated from the content obtained by the data scraper and/or the listeners. The data extracted for the content and added to the chunks is based on the content type from which the chunks are generated. Chunks are filtered by legacy system, programming language, and/or hardware to generate a training set for training a corresponding data model. The embedding layer of the language model is used to generate vector embeddings for retrieval augmented generation.

20 Claims, 4 Drawing Sheets

100

Code Generator 112
Document Generator 114
Chat Interface 116

LM Client(s) 102

Legacy System(s) 104

Network 106

Indexed Storage(s) 160

Core Agent Management System 200

Legacy System Data Scraper 210

Index Generator 220

Language Model Trainer 240

Vector Reader 250

Incoming Task Coordinator 260

System Manager 270

Language Model Agent(s) 280

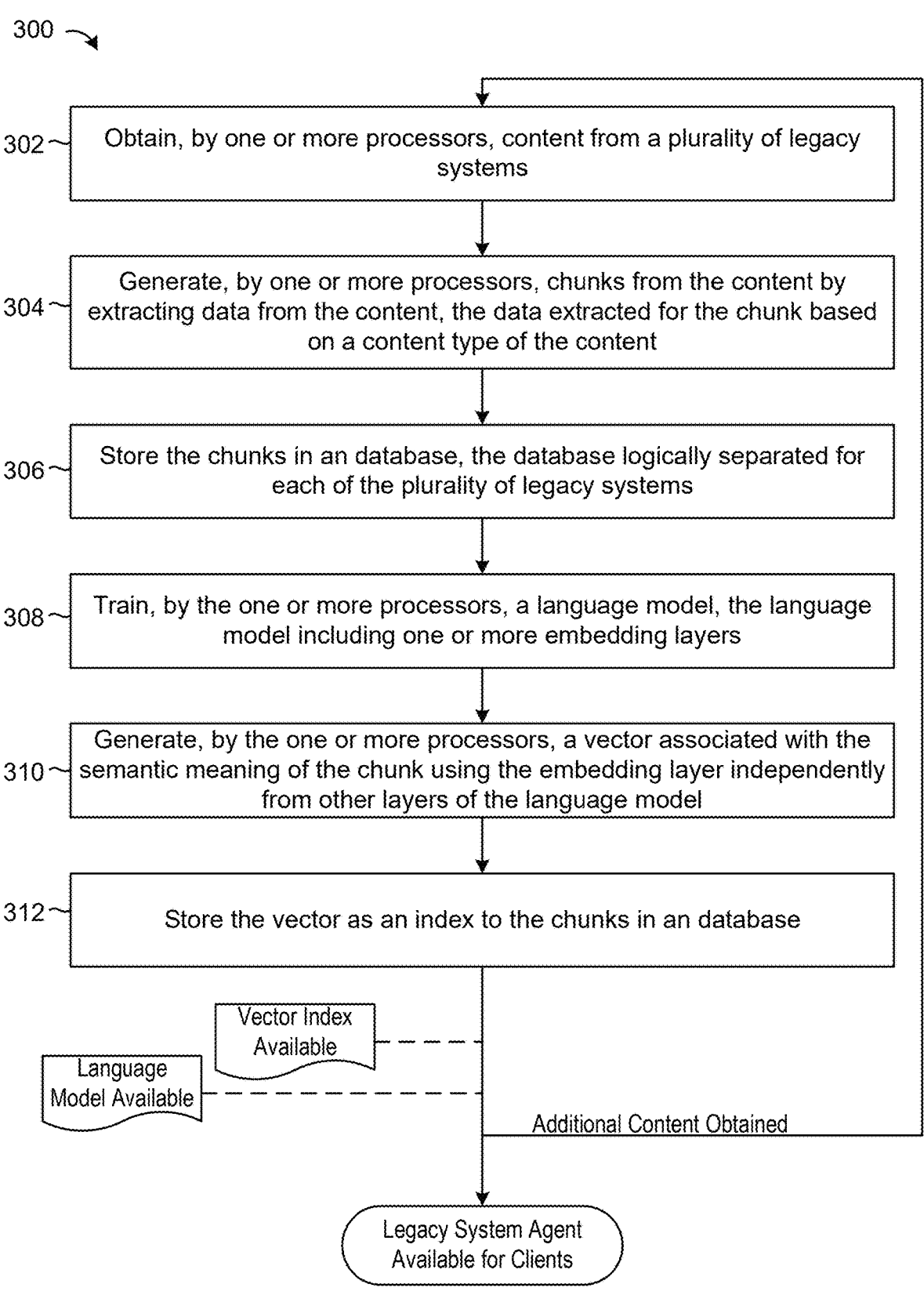

300

302 — Obtain, by one or more processors, content from a plurality of legacy systems 304 — Generate, by one or more processors, chunks from the content by extracting data from the content, the data extracted for the chunk based on a content type of the content 306 — Store the chunks in an database, the database logically separated for each of the plurality of legacy systems 308 — Train, by the one or more processors, a language model, the language model including one or more embedding layers 310 — Generate, by the one or more processors, a vector associated with the semantic meaning of the chunk using the embedding layer independently from other layers of the language model 312 — Store the vector as an index to the chunks in an database Vector Index Available Language Model Available Additional Content Obtained Legacy System Agent Available for Clients

FIG. 3

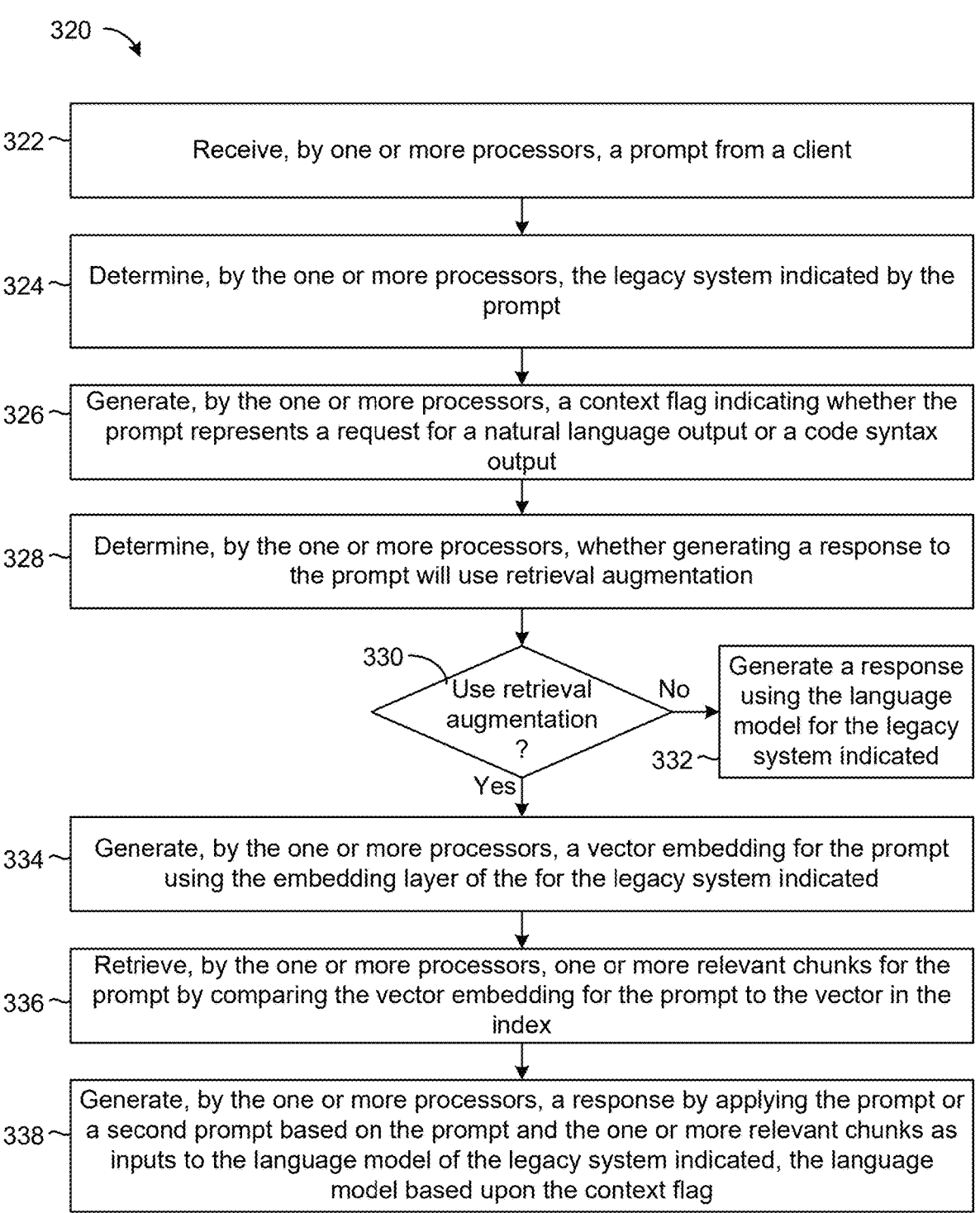

320

322 — Receive, by one or more processors, a prompt from a client

324 — Determine, by the one or more processors, the legacy system indicated by the prompt 326 — Generate, by the one or more processors, a context flag indicating whether the prompt represents a request for a natural language output or a code syntax output 328 — Determine, by the one or more processors, whether generating a response to the prompt will use retrieval augmentation 330 — Use retrieval augmentation ?

No → 332 — Generate a response using the language model for the legacy system indicated Yes ↓

334 — Generate, by the one or more processors, a vector embedding for the prompt using the embedding layer of the for the legacy system indicated 336 — Retrieve, by the one or more processors, one or more relevant chunks for the prompt by comparing the vector embedding for the prompt to the vector in the index 338 — Generate, by the one or more processors, a response by applying the prompt or a second prompt based on the prompt and the one or more relevant chunks as inputs to the language model of the legacy system indicated, the language model based upon the context flag

FIG. 4

CORE AGENT FOR GENERATION OF LEGACY INFRASTRUCTURE MODERNIZATION INTELLIGENCE MODELS

FIELD

This disclosure generally relates to generating and training language models for the evaluation of legacy systems.

BACKGROUND

Legacy systems remain pervasive in multiple industries and government entities. Legacy systems may rely on outdated technologies such as outdated hardware, database infrastructure, coding languages, etc. Many financial institutions use COBOL while some scientific institutions may use FORTRAN or other programming languages that lack modern conveniences and are difficult to maintain. Other components of system architectures may also be outdated. For example, databases may run end-of-life versions of SQL server or older versions of Oracle 8i/9i. Operating systems and hardware may also remain outdated due to internal resistance to change, regulations, and/or business inertia.

Certain language models have proven capable of suggesting or writing code examples. The language models have a range of capabilities including generating code snippets, full functions, or help debug code. Language models have become vital developer tools used to increase overall efficiency.

SUMMARY

An embodiment relates to a system for generating one or more language models for one or more legacy systems, the system includes one or more processing circuits configured to operate one or more utility agents, one or more language model agents, and one or more reader agents. The one or more utility agents are configured to obtain a plurality of content elements from the one or more legacy systems using one or more technologies. The one or more utility agents are also configured to generate a plurality of chunks by extracting data from the plurality of content elements, wherein the data extracted for a first chunk is based upon a content type for a respective content element from which the first chunk was extracted. The one or more utility agents are also configured to store the plurality of chunks in database, wherein a chunk stored in the database are retrieved based on a legacy system filter and a technology filter. The one or more utility agents are also configured to train a first language model of the one or more language models using chunks retrieved based on selections of the legacy system filter and the technology filter, wherein the first language model including one or more embedding layers. The one or more utility agents are also configured to create one or more language model agents including a first language model agent for the first language model and generate a vector associated with a semantic meaning of a second chunk using the one or more embedding layers independently from other layers of the first language model. The one or more utility agents are also configured to assign an inbound task to an assigned language model agent including the first language model or a second language model for a legacy system indicated by a prompt of the inbound task, wherein the inbound task is generated by a client application configured to receive a response to the prompt and generate a user interface element for displaying the response. The one or more reader agents are configured to generate a prompt embedding for the prompt of the inbound task, the one or more embedding layers associated with a language model for the legacy system indicated by the prompt, retrieve one or more relevant chunk from the plurality of chunks based on a similarity metric between the prompt embedding and the plurality of chunks, and provide the one or more relevant chunks to a language model agent. The one or more language model agents are configured to receive the one or more relevant chunks and generate an output by applying the prompt or a second prompt based upon the prompt and the one or more relevant chunks using the first language model.

BRIEF DESCRIPTION OF THE DRAWINGS

The features and advantages of the present disclosure will become more apparent from the detailed description set forth below when taken in conjunction with the drawings, wherein like numerals represent like elements.

FIG. 3 is a flow of operations for generating language models and a retrieval index for the core agent system of FIG. 2, according to some embodiments.

FIG. 4 is a flow of operations for modernizing a legacy system using the language modes of the core agent system of FIG. 2, according to some embodiments.

DETAILED DESCRIPTION

Figure 1:
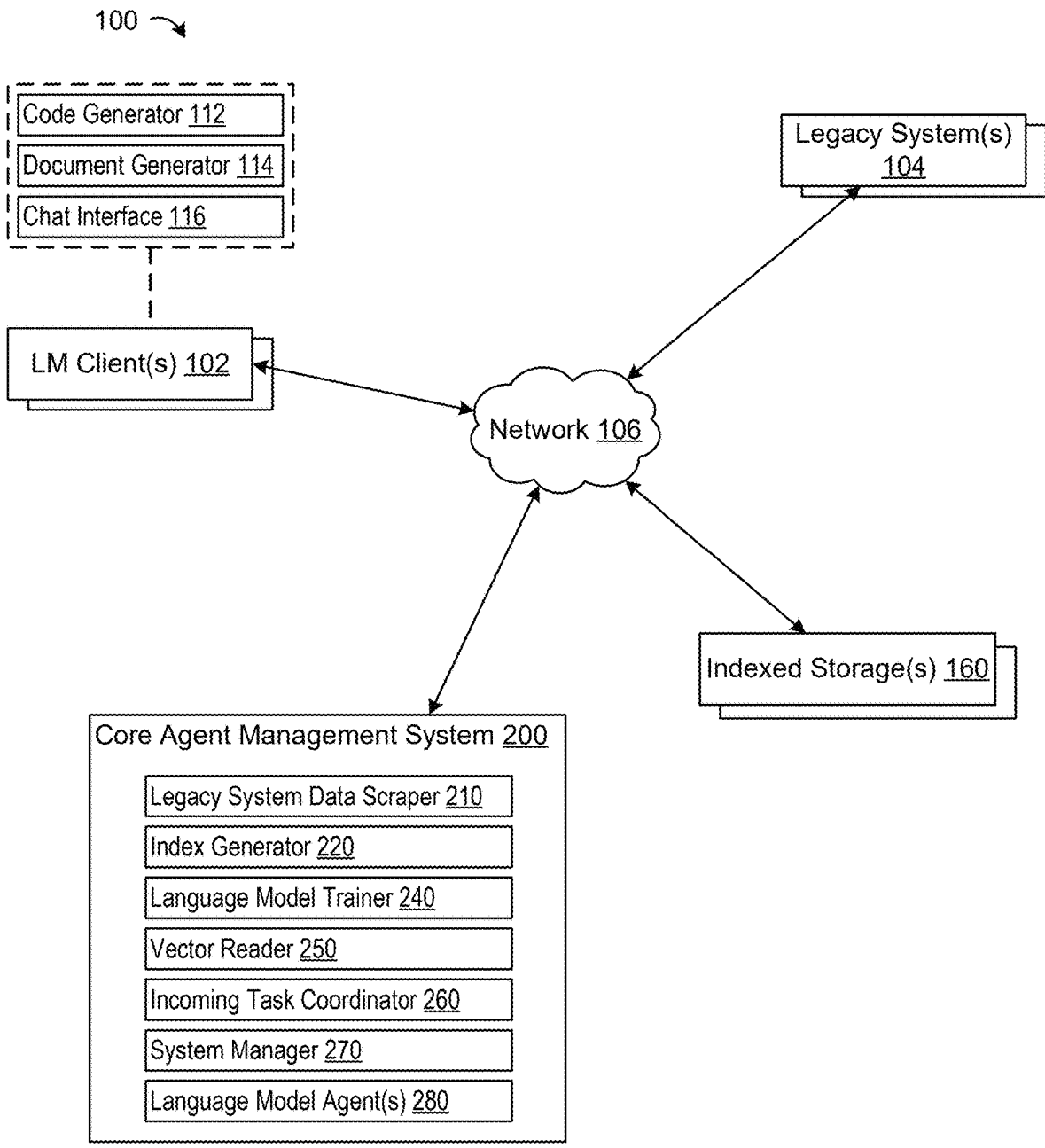
FIG. 1 is a schematic block diagram of an infrastructure modernization system, according to some embodiments.

Legacy systems are often associated with several challenges that prompt businesses to consider upgrading. Legacy systems typically have high maintenance costs due to the specialized knowledge necessary to support these older systems. In addition, legacy systems may have performance limitations. For example, such systems may not be operable on the latest hardware technology or may use inefficient coding paradigms leading to slow processing and increased power usage (e.g., monetary costs). Legacy systems may not integrate well with modern systems leading to additional inefficiencies and legacy systems may lack certain modern security features making them vulnerable to cybersecurity threats.

Large language models may be used to help developers during the upgrade process or while supporting legacy systems. However, traditional language models for code generation are not tuned to a specific system. These language models are trained on a broad dataset that includes various programming languages, frameworks, and coding styles providing for versatility. Versatility, however, may come at the expense of accuracy when applied to the specific conventions and requirements of a particular system. These language models may not be able to generate documentation for a specific environment or codebase. For some traditional language models, this can lead to the generation of code that may be syntactically correct but does not conform to the typical coding standards used by a particular system. Additionally, the generated code may be inefficient for the target environment or even unfit for its intended purpose. For example, a model trained to generate Python code may generate code that works for a particular function but does not integrate well with other functions in the system. The lack of specificity can result in code that requires significant refactoring to operate within standard coding paradigms, provide interoperability, and meet required performance benchmarks.

Issues with traditional language models become even more pronounced when applied to legacy systems. Legacy systems often have stringent requirements and unique conventions that are not well-represented in the datasets used to train traditional large language models. These systems may rely on outdated or highly specialized coding practices that are specific to legacy technology (e.g., programming languages, etc.) for which modern language models are not trained. The generated code might not only fail to adhere to the specific syntax and standards of the legacy system but also introduce inefficiencies or errors that are difficult to debug. Such errors may be introduced due to a lack of specific training data related to the legacy system or insufficient data to allow the language model to develop the correlations between words and syntax necessary to generate usable code. Furthermore, legacy systems often have limited documentation and support, making it challenging to correct or optimize the generated code. This can lead to increased maintenance costs, higher computational costs (e.g., both in monetary costs and in energy used to execute inefficient code) and potential disruptions in system operations.

The systems and methods described herein use curated datasets obtained using unique harvesting methodologies. The systems and methods can gather documentation, code, and other content related to a specific system (e.g., a legacy system, a system using outdated technology, or even a system using highly specialized modern technology) from various sources and/or tools related to the specific system. The systems and methods can train tuned language models for generating code, creating documentation, and/or answering technical support or other questions related to the specific system. For example, the systems may gather information from user interface (UI) listeners, event logs, database schema and/or metadata, error logs, and technical support tickets. The systems and methods can generate specifically trained models using the curated dataset to provide a solution to the technological problem of lacking contextual relevance and specificity associated with traditional language models when applied to supporting specialized systems.

At least one important improvement to the technological field of generating language models and/or support infrastructure for legacy and/or other highly specialized systems is improved accuracy and relevance. By training the language models and/or support infrastructure on a dataset that is specific to the target system, the generated code is more likely to align with the system's conventions, libraries, and tools. The output of the language models and/or support infrastructure may require fewer modifications or less refactoring to ensure integration with the existing codebase or code generated for additional functions. Further, the code may be more efficient when integrated within the greater system, reducing computational costs and/or energy usage in executing the generated code. In the case of document generation or technical support, the output of the language models and/or support infrastructure may be more accurate. For example, the generated language models may reduce or eliminate the occurrence of costly hallucinations leading to additional development time.

Retrieval augmentation generation (RAG) provides additional context to a language model when responding to prompts for code generation, document generation, and/or answering technical support questions. However, traditional systems can fail to retrieve relevant information from legacy systems due to the generality of their training and data gathering. The systems and methods described herein train a tuned language model for a specific legacy system and, in addition, use an embedding layer of the language model to generate an index for the content extracted from the system. Generating an index using an embedding layer that is also trained with a dataset that is specific to the target system may improve semantic representations of the content within its respective key of the index, allowing for improved retrieval augmentation.

In some embodiments, the systems and methods described herein associate content that is generated at similar times. For example, technical support tickets that are opened may be associated with error logs that occurred at approximately the same time. Additionally or alternatively, error logs may be associated with UI actions. By associating content that may include a cause-and-effect relationship or may otherwise be correlated, the tuned language models can learn correlations between different content types and provide additional contextual relevance during training, further increasing the accuracy and usefulness of the responses over traditional language models.

Infrastructure Modernization System

FIG. 1 shows an infrastructure modernization system 100 configured to provide development support for one or more legacy systems 104. The infrastructure modernization system 100 is shown to include one or more language model clients 102, the one or more legacy systems 104, one or more indexed storages 160, and a core agent management system 200 communicably connected via a network 106. In some embodiments, the infrastructure modernization system 100 leverages the core agent management system 200 to provide semantic reasoning, code generation capabilities, documentation, and/or technical support to the one or more language model clients 102 (e.g., applications, user interfaces, chatbots, etc.) related to the one or more legacy systems 104. The core agent management system 200 may provide agents configured to scrape (e.g., obtain, get, acquire, etc.) content from the various subsystems of the one or more legacy systems 104, train language models (LMs) for additional agents configured to provide technical support related to a legacy system of the one or more legacy systems 104, and generate an indexed retrieval database to provide relevant information (e.g., portions of the content or chunks) to the LMs to further enhance the capability of the LM agents.

FIG. 1 shows a non-limiting example of a possible configuration of the core agent management system 200. It is contemplated that the various components of the core agent management system 200 may be distributed across discrete systems and/or hardware in different ways. For example, one or more indexed storages 160 may be included with the same hardware (e.g., on the same machine) as the core agent management system 200. Additionally or alternatively, the one or more language model clients 102 may be included within the one or more legacy systems 104 (e.g., for seamless access to the support functionality of the core agent management system 200).

Similarly, the components, features, and/or functionality of the infrastructure modernization system 100 may be implemented using various architectures and design paradigms all of which are included in the scope of the present disclosure. For example, the core agent management system 200 may be implemented having an agentic architecture, a service architecture, and/or an architecture using a combination of both agents and services in order to perform the functionality described herein.

While the infrastructure modernization system 100 and the core agent management system 200 providing much of the functionality are described from the technical viewpoint of supporting and/or upgrading a legacy system, it is contemplated that such a system may be used for other development operations (dev ops) or software lifecycle management scenarios. For example, pioneering systems using technology at the forefront of development may be similarly difficult to support. The infrastructure modernization system 100 can be used to provide answers to developer questions, generated documentation, and/or generate code using language models trained based on the systems and method described herein.

The network 106 can include routers, switches, antennas, computers, and any other hardware required to communicate information between the components of the infrastructure modernization system 100 (e.g., from the core agent management system 200 to the one or more language model clients 102). A portion of the network 106 can be wireless and/or a portion of the network 106 can be wired. The network 106 can include one or more networks with routers to facilitate data transfer between the different networks.

In some embodiments, the one or more language model clients 102 provide the interface between the core agent management system 200 and the LMs (e.g., LM agents, embedding models, etc.) and the users of the system (e.g., developers, technical support providers, customer service providers, etc.). The one or more language model clients 102 may use one or more application programming interfaces (APIs) provided by the core agent management system 200 to initiate, interact with, and use the functionality provided by the core agent management system 200.

The one or more language model clients 102 may use a prompt API to provide certain functionality within the user interface of the one or more language model clients 102. The prompt API, for example, may allow the one or more language model clients 102 to communicate prompts to the LMs of the core agent management system 200. For example, the prompt API may include a queue to which the one or more language model clients 102 can post prompt tasks and later get the results and/or check on status. Additionally or alternatively, the one or more language model clients 102 may provide some or all of the functionality through a GET request without the use of a queue.

The one or more language model clients 102 may provide functionality on their respective UIs using the prompt API. In some embodiments, one or more language model clients 102 are configured to provide a chatbot type service. The UI may provide a text box element within which a user can enter a prompt (e.g., a question, request, etc.) for one or more LMs of the core agent management system 200. The prompt entered may be directly sent to the LMs (e.g., after some trigger such as pressing a "send" button, pressing enter on a keyboard, etc.) or the prompt may undergo some preprocessing prior to being delivered to the LMs. For example, the API or the core agent management system 200 may provide preprocessing to intercept prompts that do not require the LM, or that appear to be incomplete, etc. To facilitate multiple use scenarios the API may also be provided over text services (e.g., texting applications, SMS, etc.).

In some embodiments, the prompt API includes additional parameters that can be used to change behavior when processing a task. For example, the prompt API may provide a legacy system selection field to provide a mechanism for selecting the appropriate language model to which the prompt should be directed. Additionally or alternatively, the prompt API may provide additional fields that represent alternative or non-textual input into the LM. The prompt API may provide a code generation flag that is used to inform the language model whether code is an expected output for a particular prompt.

In some embodiments, and for some UIs, the application may determine the values for the additional fields to send to the prompt API. The additional fields may be determined based on other information (e.g., contextual information) on the UI. For example, the UI may have a selection switch that explicitly changes the call to the API between code generation mode or natural language processing mode. In some embodiments, the one or more language model clients 102 determine the additional parameters to provide to the core agent management system 200 via the API based on the text of the prompt. For example, the one or more language model clients 102 may have some generic and/or lightweight natural language processing capability to determine the parameters for the API input.

The one or more language model clients 102 may include a document generator application 112 (or a code generator feature) to provide document generation in a user interface. Documentation may be provided for elements of a legacy system of the one or more legacy systems 104. For example, the element may include functions, database tables, schema, etc. In some embodiments, the document generator application 112 stores multiple prompt templates to generate a document related to a particular element of the legacy system. The prompt templates may be combined with the particular element of the legacy system and provided to an LM of the core agent management system 200 to generate text related to standard fields for the document being generated.

In some embodiments, each type of element (e.g., function, variable name, database column, etc.) is associated with a particular set of data fields that are included in the documentation. The UI (e.g., of the document generator application 112) may have a layout for each type of element with a location for each field associated with the element type. The one or more language model clients 102 may combine prompt templates based on the type of element and for each field with the element for which documentation is being generated (e.g., displayed within the UI). The one or more language model clients 102 may thereby convert unstructured data from various sources of the one or more legacy systems 104 into structured documentation.

The one or more language model clients 102 may include a code generator application 112 to provide code generation capability. In some embodiments, the code generator application 112 includes prompt templates for the LMs of the core agent management system 200. The prompt templates can be combined with contextual information within a UI of the one or more language model clients 102 to generate a prompt for the LMs. For example, the UI may include a selection box for a legacy system of the one or more legacy systems 104 and a technology used by the legacy system (e.g., coding language, library, etc.) and/or a window for the user to enter a code generation prompt. The prompt entered by the user may be combined using a prompt template with the selected legacy system and the selected technology (e.g., to direct the prompt to a correct language model and/or to provide context to the language model). The one or more language model clients 102 may use an API provided by the core agent management system 200 to communicate a prompt for code generation. The call to the API may include a flag indicating that the prompt is for code generation.

The one or more language model clients 102 may combine multiple functionalities described herein within a single client application and/or user interface view. For example, the one or more language model clients 102 may include a user interface that allows the user to select an element related to the legacy system to generate documentation for that element. The user interface may also include an interface element for entering a prompt for code generation (e.g., in a different view, additional pane, within a split window, etc.). The user interface may include context from the element of the legacy system that is being viewed within the documentation generation view and the prompt that is entered in the interface element for code generation. Additionally or alternatively, the user interface may include a chat window where a user can ask certain questions related to the legacy system and/or the currently viewed element thereof. The user interface may also provide context related to the currently viewed element when providing the core agent management system 200 with the chat prompt.

A chatbot application (e.g., having a chat interface 116) of the one or more language model clients 102 may provide technical support, help in debugging, or provide answers to general questions related to the legacy system. The chat interface 116 may be combined with other user interface views as previously described. Additionally or alternatively, the chat interface 116 may be included in a standalone application (e.g., on a phone application). In some embodiments, the chat interface 116 includes context awareness between the chatbot application and a separate application when the two applications are hosted on different clients of the one or more language model clients 102. For example, the applications may determine the user's identity through login information, IP address, etc. and associate the two sessions for context sharing.

The one or more language model clients 102 can include various hardware and/or architectures. The one or more language model clients 102 may include processors communicably coupled with memory. In some embodiments, the one or more language model clients 102 are implemented in a cloud architecture. The one or more language model clients 102 may include remote servers, nodes within a computing cluster, or appropriate hardware for providing web-based applications.

The one or more legacy systems 104 include software platforms. In some embodiments, the software platforms include legacy systems (e.g., running on old technology, using outdated coding languages, using outdated coding practices, etc.); the software platforms may be otherwise difficult to support (e.g., using cutting-edge hardware, etc.). In some embodiments, the user of the core agent management system 200 may be actively upgrading a legacy system of the one or more language model clients 102 to new technology. The infrastructure modernization system 100 and the core agent management system 200 may provide equal value to the support of current systems as well. For example, the core agent management system 200 provides specifically trained LMs for a particular system and agents/services for extracting content used to train the LMs. Advantageously, the content used to train the LMs may be extracted from within a local network, for example using content that is not available to an general LM or content that, for regulatory reasons, cannot be exposed outside of the local network.

A legacy system of the one or more legacy systems 104 may include several subsystems that support the legacy system. In some embodiments, the subsystems are included within the same platform, architecture, etc. of the legacy system. Alternatively, the subsystems may include external platforms, for example, with an isolated portion for the legacy system. The subsystems may include a combination of subsystems implemented internally to the legacy system and subsystems on external platforms.

Non-limiting examples of subsystems include code repositories, technical support ticketing systems, development project management systems, web servers and user interfaces thereof, logs (e.g., event logs, error logs, etc.), and databases. The core agent management system 200 may be configured to extract content from one or more of the subsystems of the one or more legacy systems 104. Non-limiting examples of content that the core agent management system 200 may obtain (e.g., get, acquire, receive, etc.) from the one or more legacy systems 104 and their subsystems include source code, system configuration parameters, schema files, API definitions, log files, user interface actions and callbacks, technical support tickets, developer stories, use cases, and database entries (e.g., column names, keys, descriptions, etc.)

The one or more indexed storages 160 may be configured to store information generated/extracted by the core agent management system 200. For example, the one or more indexed storages 160 may store chunks of content for retrieval augmentation along with index keys (e.g., semantic vector embeddings) associated with the chunks. In some embodiments, the one or more indexed storages 160 store functions, database entries, etc. for the one or more legacy systems 104. The network 106 may store a system tree that can be used to select a function, database entry, etc. in a user interface. The user interface may generate prompts to generate documentation, ask questions, etc. related to the selected function, or database entry. In some embodiments, the functions and database entries are stored in a tree format indicating a parent/child relationship and/or a classification of the data. Additionally or alternatively, the one or more indexed storages 160 may store relational information between the functions and/or between the database entries to generate similar views within the UI.

The one or more indexed storages 160 may be logically separated (e.g., the chunks for a particular legacy system are stored independently of other legacy systems). Alternatively, the chunks may be stored together in a single indexed storage. The one or more indexed storages 160 may include one or more flags in the index keys to provide efficient searching and/or filtering of the chunks by the one or more legacy systems 104 and/or the technology (e.g., programming language, etc.) used by the one or more legacy systems 104.

In some embodiments, the core agent management system 200 searches the one or more indexed storages 160 for relevant chunks from previously extracted content. The core agent management system 200 may search the index keys using a semantic search to identify relevant chunks. Additionally or alternatively, the core agent management system 200 may provide a search criterion to the one or more indexed storages 160 (e.g., an embedding vector for a prompt, a keyword, etc.) and the one or more indexed storages 160 may return relevant chunks to the core agent management system 200.

In FIG. 1, the infrastructure modernization system 100 is shown to include the core agent management system 200. The core agent management system 200 may provide the systems and methods for generating and interacting with LMs trained on various types of content extracted from the one or more legacy systems 104. Certain components of the core agent management system 200 are shown within FIG.

1 according to some embodiments. The core agent management system 200 of FIG. 1 is shown to include a legacy system data scraper 210, an index generator 220, a language model trainer 240, a vector reader 250, an incoming task coordinator 260, a system manager 270, and language model agents 280. The core agent management system 200 may be architected as several interacting services. The services may communicate via APIs that allow one service to change the state (e.g., queue, configuration, etc.) of another service. The core agent management system 200 may be architected as several agents interacting to perform certain functionality. The core agent management system 200 may be implemented as a monolithic service (e.g., a single service). Individual components of the core agent management system 200 may be architected using any one of these design paradigms leading to a hybrid core agent management system 200.

The core agent management system 200 may include the legacy system data scraper 210 configured to extract content from the one or more legacy systems 104. The legacy system data scraper 210 may obtain (e.g., receive, get, acquire, etc.) content from various sources of the one or more legacy systems 104. For example, the legacy system data scraper 210 may be configured to communicate with any of the subsystems of the one or more legacy systems 104 previously described herein. In some embodiments, the legacy system data scraper 210 initially connects to the one or more legacy systems 104 to download (e.g., transfer etc.) all data from the various subsystems into a central system. After the initial connection, the legacy system data scraper 210 may poll for data (e.g., periodically request the data) or the legacy system data scraper 210 may subscribe to updates (e.g., the subsystem sends new information to the 210 as updates occur).

The core agent management system 200 may include an index generator 220 configured to generate chunks from that content. For example, one or more chunks may be extracted from each content element. The type of the one or more chunks, how they are extracted, etc. may be based upon the type of content element. For example, if a content element is a source code file, a chunk may include a function, the function variables, a description of the function, etc. The chunk information may be obtained from the content element programmatically or by way of a generic language model, for example, to extract the function information or to summarize the information. For example, a generic language model may be used to summarize a content element (e.g., content that is not in a natural language format, UI actions, etc.). The chunks generated by the index generator 220 may be used to train a language model. For example, a language model that is tuned for a particular legacy system of the one or more legacy systems 104.

In some embodiments, the index generator 220 generates an embedding vector related to chunks stored in the one or more indexed storages 160. The chunk may be associated with a particular legacy system for which a corresponding language model of the language model agents 280 was trained. The embedding vector may be generated using an embedding layer of the corresponding legacy system. The index generator 220 may request the embedding layer (e.g., the parameters of the embedding layer) from the language model agents 280 to generate the vector embedding. Additionally or alternatively, the index generator 220 may communicate a request (e.g., task, job, etc.) to an agent having the corresponding language model of the language model agents 280 and provide the chunk to be embedded. The embedding vector may be used as an index key for the embedded chunk. For example, during retrieval augmentation, an embedding of a prompt may be compared to the index keys (including vector embeddings) to determine chunks that include information relevant to the prompt. Using the embedding layer from the corresponding language model trained for the particular legacy system may advantageously cause the embeddings to be tuned for that legacy system as well resulting in improved retrieval augmentation when searching for relevant chunks.

The core agent management system 200 may include a language model trainer 240 configured to generate language model training sets from the chunks in the one or more indexed storages 160 and to train (e.g., adjust parameters of, determine parameters for, etc.) a language model. To generate the training sets, the language model trainer 240 may filter chunks based on a particular legacy system (e.g., to train a model for the particular legacy system) and/or the language model trainer 240 may filter chunks based on a type of technology used (e.g., to train a model for the type of technology: programming language, hardware, etc.). The language model trainer 240 may train a language model using a training set from a particular filtering of chunks and thereby train a language model for the particular legacy system or the type of technology used.

The language model trainer 240 may train a language model according to a training set and a loss function. The language model trainer 240 may reduce the loss function for the training set by adjusting the parameters of a language model architecture (e.g., connections between layers, etc.). For example, the language model trainer 240 may reduce a cross-entropy loss between the predictions of a next word from the language model and the actual next word in the training set. Other loss functions or refinements of the cross-entropy loss may be used. For example, the loss function may be tailored to identify similar or dissimilar chunks or portions thereof to improve semantic understanding and embedding layers of the trained language model.

The core agent management system 200 may include a vector reader 250 configured to retrieve relevant chunks from the one or more indexed storages 160. The vector reader 250 may perform a semantic search, for example, by comparing a vector embedding of a prompt to those of the index and/or performing a keyword search on the chunks. In some embodiments, the vector reader 250 includes a set (e.g., group, list, etc.) of prompts and/or search criteria to retrieve chunks related to a standard UI view. For example, an API of the core agent management system 200 could offer standard information retrieval performed by the vector reader 250.

The core agent management system 200 may include the incoming task coordinator 260 configured to route incoming tasks to the various agents and/or services of the core agent management system 200. The incoming task coordinator 260 may provide one or more APIs that the one or more language model clients 102 use to interact with the core agent management system 200 or generate content for the user interfaces of the one or more language model clients 102. The incoming task coordinator 260 may queue the incoming (e.g., inbound, arriving, etc.) task and/or direct it to an appropriate agent. For example, the incoming task coordinator 260 may determine the legacy system related to the incoming task and direct the task to an appropriate language model agent 280. The incoming task coordinator 260 may also determine if retrieval augmentation is required and direct an incoming task to the vector reader 250 accordingly.

The core agent management system 200 may include a system manager 270 configured to manage enrollment of new legacy systems and/or to initiate retraining of the language models for the language model agents 280. In some embodiments, the incoming task coordinator 260 and/or the language model agents 280 may recognize an incoming task and/or prompt that is for a legacy system for which there is no language model, chunks, and/or index. The system manager 270 can enroll a new legacy system, for example, responsive to an indication from the incoming task coordinator 260 and/or the language model agents 280. Similarly, the system manager 270 may determine when an amount of additional content is received and initiate a retraining of the language models.

In some embodiments, the core agent management system 200 includes one or more language model agents 280. The language model agents 280 may include language models trained on the content extracted from the one or more legacy systems 104 obtained by the legacy system data scraper 210. The language model agents 280 may include language models to respond to prompts for a particular legacy system and/or a type of technology (e.g., programming language, hardware, etc.). In some embodiments, the language model agents 280 also provide embedding layers to the vector reader 250 to generate vector embeddings used as keys to chunks in the one or more indexed storages 160.

Figure 2:
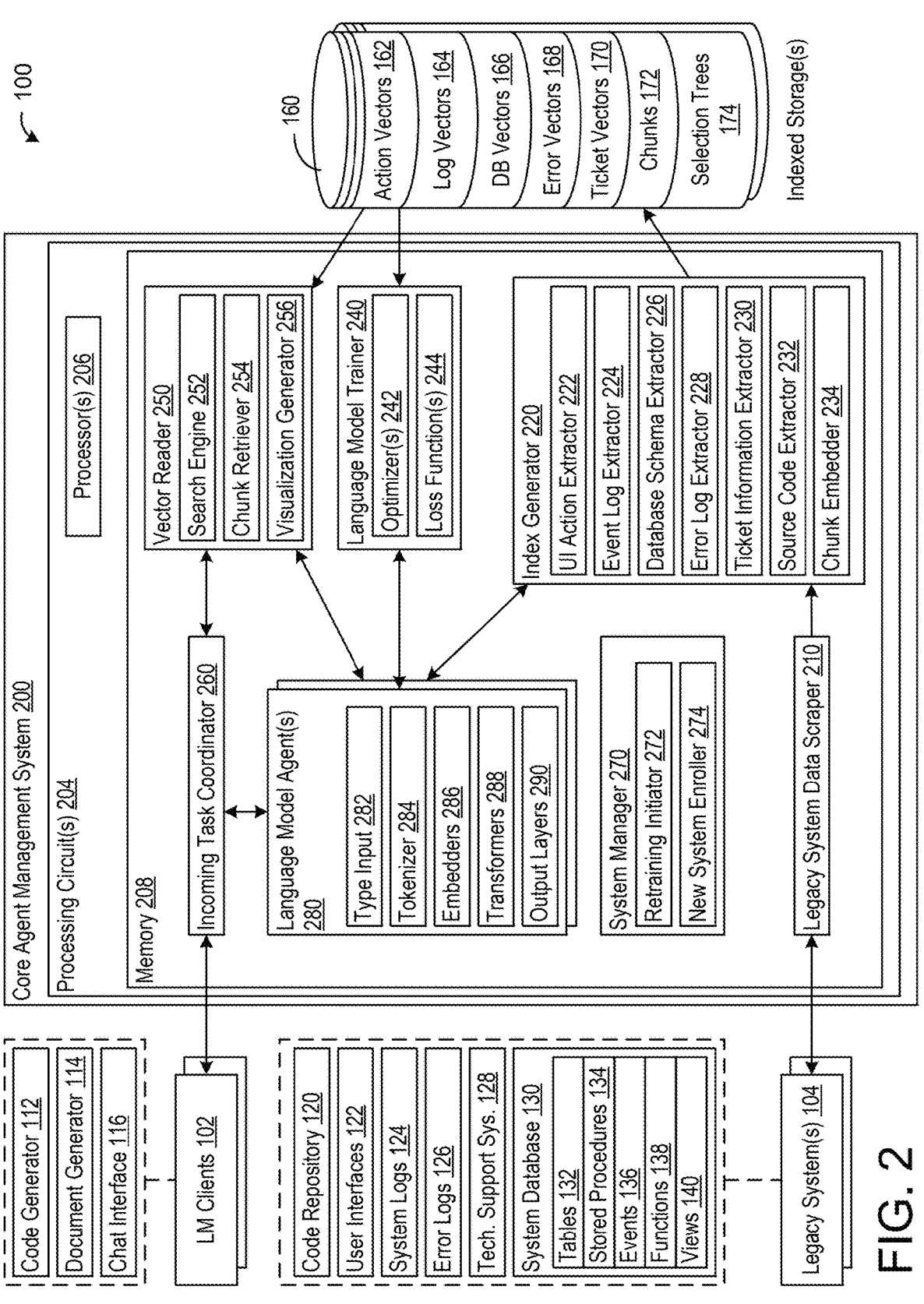
FIG. 2 is a schematic block diagram of a core agent system for the generation of legacy infrastructure modernization intelligence models of FIG. 1, according to some embodiments.

FIG. 2 shows a block diagram of the core agent management system 200 according to some embodiments. FIG. 2 illustrates a detailed view of the instruction sets available in the various subsystems, agents, and/or services in some embodiments of the core agent management system 200. The core agent management system 200 is shown as a single entity (e.g., hardware) in FIG. 2. However, it is contemplated that the agents and/or instruction sets included in the core agent management system 200 be distributed over any number of computer hardware devices and in any manner of architecture (e.g., local network, cloud-based, etc.).

The core agent management system 200 is shown to include one or more processing circuits 204 having one or more processors 206 and memory 208.

The one or more processors 206 may be general purpose or specific purpose processors, an application specific integrated circuit (ASIC), one or more field programmable gate arrays (FPGAs), a group of processing components, or other suitable processing components. The one or more processors 206 may be configured to execute computer code and/or instructions stored in the memory 208 or received from other computer readable media (e.g., CDROM, network storage, a remote server, etc.). The one or more processors 206 may be configured in various computer architectures, such as graphics processing units (GPUs), distributed computing architectures, cloud server architectures, client-server architectures, or various combinations thereof. A first set of the one or more processors 206 can be implemented by a first device, such as an edge device, and a second set of one or more processors 206 can be implemented by a second device, such as a server or other device that is communicatively coupled with the first device and may have greater processor and/or memory resources.

The memory 208 may include one or more devices (e.g., memory units, memory devices, storage devices, etc.) for storing data and/or computer code for completing and/or facilitating the various processes described in the present disclosure. The memory 208 may include random access memory (RAM), read-only memory (ROM), hard drive storage, temporary storage, non-volatile memory, flash memory, optical memory, or any other suitable memory for storing software objects and/or computer instructions. The memory 208 may include database components, object code components, script components, or any other type of information structure for supporting the various activities and information structures described in the present disclosure. The memory 208 may be communicably connected to the processors and can include computer code for executing (e.g., by the processors) one or more processes described herein. For example, many of the components of the core agent management system 200 may be implemented as instruction sets stored by the memory 208 and executed by the one or more processors 206.

In FIG. 2, the core agent management system 200 is shown to include a legacy system data scraper 210, an index generator 220, a language model trainer 240, a vector reader 250, an incoming task coordinator 260, a system manager 270, and one or more language model agents 280.

The core agent management system 200 may include the legacy system data scraper 210 configured to extract content from various sources within the legacy systems 104. For example, the legacy system data scraper 210 may initially connect to a legacy system of the one or more legacy systems 104 to download all content into a central system and subsequently the legacy system data scraper 210 may poll for content or subscribe to content updates from subsystems of the legacy system.

The legacy system data scraper 210 may initially connect to a legacy system of the one or more legacy systems 104 to obtain (e.g., receive, acquire, get, etc.) available content from one or more subsystems of the legacy system. Subsystems of the legacy system may include a system database 130 having tables 132, stored procedures 134, events 136, functions 138, and views 140; a technical support subsystem 128; log files including error logs 126 and system logs 124; user interfaces 122; and a code repository 120. Some of the subsystems may provide an API from which the legacy system data scraper 210 can obtain the content. For example, the legacy system data scraper 210 may obtain a base uniform resource locator (URL) for the subsystem's API endpoint and instructions on how to interact with the API. In some embodiments, a developer may add the URL and/or the API call template to a configuration file for the core agent management system 200. Additionally or alternatively, the legacy system data scraper 210 may include agentic intelligence allowing the legacy system data scraper 210 to browse (e.g., view, monitor) the local network to find or determine URLs for various subsystems of the legacy system and determine how to interact with the API.

The legacy system data scraper 210 may subscribe for updates related to the subsystems of the legacy system. For example, the subsystem may provide a subscription API and send notifications when new content is available to be retrieved. Additionally or alternatively, the legacy system data scraper 210 may poll the API to determine if an update is available. For example, the subsystem may track the last time content was polled and provide only the latest content. Alternatively, the legacy system data scraper 210 may store the last time it polled content from the subsystem and request information after the stored time.

Some systems may not provide an API for which content is extracted. For example, the legacy system data scraper 210 may be configured to extract UI events/actions from the UI subsystem of the legacy system by creating a listener for the UI. The listener may respond to specific user actions such as activating a button and/or predefined keypresses. The listeners may store the key presses, or button clicks that caused one or more UI callback functions to be triggered.

The legacy system data scraper 210 may also use the listeners to extract correlated actions within the UI, for example, preceding the action (or callback) and/or after the function or callback.

In some embodiments, the legacy system data scraper 210 creates an indication (e.g., on a developer UI, email, etc.) for a legacy system that has been enrolled in the system (e.g., has a corresponding configuration in the core agent management system 200), but does not yet have any content and/or content extraction is failing. The indication may be displayed on a UI (e.g., a developer UI) for the core agent management system 200 to initiate a corrective action. For example, the developer may enter the URL for the endpoints of an API or may alternatively correct endpoint URLs (for example, if discovered to be incorrect by the legacy system data scraper 210).

The core agent management system 200 may include an index generator 220 configured to generate chunks from content obtained by the legacy system data scraper 210. For example, one or more chunks may be extracted from each content element. The index generator 220 may include a number of extractors, for example, the index generator 220 may include an extractor for each type of content and/or each subsystem from which the content is obtained. Each extractor may be configured to generate a specific set of material (e.g., data fields, etc.) dependent on the content type. In some embodiments, the index generator 220 includes a UI action extractor 222, an event log extractor 224, a database schema extractor 226, an error log extractor 228, a ticket information extractor 230, and a source code extractor 232. Chunks generated by the extractors 222-232 may be stored in chunks 172 of the one or more indexed storages 160.

The index generator 220 may receive content that has been obtained by the legacy system data scraper 210 and generate chunks for that content. Each extractor 222-232 may generate the specific set of material in a natural language format. For example, the extractors 222-232 may be configured to summarize UI actions, event logs etc. to obtain text that is amenable to training a language model for the one or more language model agents 280. In some embodiments, the index generator 220 and/or the extractors thereof may use a generic language model to summarize an event log or other content in a natural language format that can be used to train the language models. In some embodiments, the generic language model is a multi-modal language model. The extractors 222-232 may include specific prompts for the generic language model to maintain the specificity and the relationship of the legacy system from which the content was obtained. For example, the prompt may request that the generic language model specifically use words, function names, variable names, phrases, and/or sentences found in the original content. Some details of each of the extractors are described herein; however, it is contemplated that where applicable (e.g., compatible, possible, etc.) features described for one extractor may be applied by a different extractor.

The UI action extractor 222 may be configured to convert the output of a UI listener to a chunk of a standard format (e.g., standard for all UI actions). A listener of the legacy system data scraper 210 may generate an output related to an action occurring in the user interfaces 122. The output may then be processed by the UI action extractor 222. The UI action extractor 222 may define standard data that is stored in a chunk for each action on the UI page. For example, each chunk stored for an action may include data fields such as a timestamp, a user identification, an action type, a UI callback processed, a short description of the action, data entered with the action, relevant metadata, etc. The standard data may be further defined by the type of action that occurred (e.g., button click, form submission, page view, etc.). For example, a chunk generated for a form submission may include capturing the data entered with the form as a separate data field, whereas a chunk generated for a button click may not include such data.

In some embodiments, the UI action extractor 222 generates the chunk in a natural language format. For example, instead of or in addition to having specific name-value pairs (e.g., "timestamp: 20251223T193221") the UI action extractor 222 could provide a sentence in natural language (e.g., "The action X occurred on Dec. 23, 2025 at 19:32:21"). The UI action extractor 222 may generate sentences in natural language for each of the data fields for a particular type of action. The UI action extractor 222 may generate the sentences using templates to fill in information for a name-value pair. Additionally or alternatively, the UI action extractor 222 may use a generic language model to convert the data into natural language.

In some embodiments, the UI action extractor 222 combines outputs from several listeners into a single chunk. For example, the UI action extractor 222 may generate a page view chunk that includes a diary or timeline of the listeners that were triggered. If a webform is submitted, the UI action extractor 222 may store the information that was entered into the webform, for example, to include additional context related to the events that were occurring at the time the web form was completed. Advantageously, the UI action extractor 222 may generate chunks that include successful submissions on the webpage and chunks that include incorrect submissions for training the language model. In addition, the UI action extractor 222 may generate chunks that include a corrective action that led to a successful submission after an incorrect submission.

In some embodiments, the UI action extractor 222 is configured to determine the UI events that should be listened for (e.g., monitored, etc.). The UI action extractor 222, for example, may learn of functions and/or UI callbacks from other extractors (e.g., the source code extractor 232) and request a listener to be made for those functions. Advantageously, the core agent management system 200 provides the ability to automatically determine functions to which the listeners should be attached.

Language models may be trained with the chunks generated by the UI action extractor 222. The language models may learn correlations between user interactions, identify patterns, and generate insights in response to user prompts. The language models trained with the chunks extracted by the UI action extractor 222 may be used to provide technical support and/or help developers make data driven decisions to enhance the UI.

The event log extractor 224 may be configured to convert event logs into a standardized form (e.g., to create chunks). The legacy system data scraper 210 may provide the event log extractor 224 with text-based log files obtained from a legacy system of the one or more legacy systems 104 (e.g., stored in the system logs 124). The log files may include several entries in a single file. For example, event logs may be added to a file until the file reaches a certain size and/or the file may represent a certain time period. The log file may record certain events such as changes in parameters, changes in the state of the legacy system, interactions with an API, etc. The event log extractor 224 may be configured to convert a log file into one or more chunks in the standardized form (e.g., having standard information).

The event log extractor 224 may convert the log file into one or more chunks. The event log extractor 224 may include instructions for splitting multiple entries of a log file into one or more chunks. For example, the event log extractor 224 may break log files into chunks for each timestamp indicated in the log file. As another example, the event log extractor 224 may recognize a delimiter between individual entries of the log file. A chunk from the log file (e.g., of event log type, etc.) may include all the text between two of the delimiters. The delimiters may be provided by the legacy system from which the log files were extracted and/or the delimiters may be determined by the event log extractor 224. In some embodiments, the event log extractor 224 uses a language model (e.g., a generic language model or a language model already trained for the legacy system) to determine the extent of a single chunk. For example, the language model may recognize when the semantic meaning of the log file changes and decide to split the log file into chunks at this change.

A chunk from a log file provided to the event log extractor 224 may be in a structured format. For example, the chunk may include name-value pairs (e.g., in XML or JSON format). Additionally or alternatively, the chunks may also include text in natural language form, for example, generated using a language model or sentence templates as described with reference to the UI action extractor 222. The chunk may include information (e.g., data fields, standard data, etc.) related to the timestamp of the log entry, the log level (e.g., priority, severity, importance, etc.), the body of the entry (e.g., log message, etc.), and/or additional relevant metadata.

Language models may be trained with the chunks generated by the event log extractor 224. The language models may learn correlations between log entries, identify patterns and/or anomalies and generate insights related to the behavior of the legacy system. In some embodiments, the chunks from various sources are combined for training a language model. The chunks may be combined for training based on a criterion other than the chunk type. For example, the chunks may be processed together based on timestamps. Advantageously, the language model can learn correlations between UI actions and log entries thus allowing the language model to associate a particular UI action with an event described in a chunk from the event log extractor 224.

The error log extractor 228 may receive log files from the error logs 126 obtained by the legacy system data scraper 210. The error log extractor 228 may generate chunks in many of the same ways as the event log extractor 224. For example, the error log extractor 228 may include similar options, but operate using different parameters.

The database schema extractor 226 may be configured to convert database entries into one or more chunks, for example, in a standard form or with standard data fields where the standard form is based on types of database entries from which the chunk is derived. A database for a legacy system of the one or more legacy systems 104 may include tables 132, stored procedures 134, events 136, functions 138, and views 140. A chunk may be generated by a different procedure (e.g., different instructions) for each of the different entry types.

The database schema extractor 226 may generate chunks including table names, column names, data types (e.g., float, string, enumeration, etc.), primary keys, and/or units of measure. Additionally or alternatively, chunks may include the names of stored procedures; parameters for the stored procedures; return types, the code/body of the stored procedure; event names and schedules thereof; and functions. In some embodiments, the database schema extractor 226 may execute functions, stored procedures, and/or queries against the database of the legacy system in order to create content and generate chunks. For example, the database schema extractor 226 may access system views using INVROMA-TION_SCHEMA.TABLES or INFORMATION_SCHE-MA.ROUTINES.

The database schema extractor 226 may generate chunks using a name-value pair or a natural language format as previously described for other extractors. For example, the database schema extractor 226 may generate chunks using sentence templates and/or general language models.

In some embodiments, the database schema extractor 226 generates a selection tree for various components of the system database 130 for the legacy system. The selection tree may be stored in the selection trees 174 of the one or more indexed storages 160. The selection tree may be used to provide input to selection elements of UIs of the one or more language model clients 102, for example, to select a database element for which documentation for the one or more language model clients 102 is to be generated.

The ticket information extractor 230 may be configured to convert technical support tickets into chunks that may be used to train a language model and/or augment a prompt with relevant information (e.g., via retrieval augmentation). The legacy system data scraper 210 may provide the ticket information extractor 230 with text-based log files obtained from a legacy system of the one or more legacy systems 104 (e.g., stored in the technical support subsystem 128). Each of the technical support tickets may include standard information (e.g., as name-value pairs filled out in a web form). For example, the technical support tickets may include data fields such as a timestamp, an identifier, an environment (e.g., production, quality assurance, etc.), a support layer, tier, or level (e.g., L1 or basic trouble shooting, L2 which may include operations engineers, and/or L3 or developer support). The ticket information extractor 230 may be configured to convert a log file into one or more chunks in the standardized form (e.g., having standard information).

The ticket information extractor 230 may convert the log file into one or more chunks. The technical support tickets may include information already in name-value pair format. The ticket information extractor 230 may create a chunk that remains in the name-value pair format. The ticket information extractor 230 may use the original data field provided by the technical support subsystem 128, may change the data fields using conversion instructions, and/or may add or delete data fields to conform to a standard format. The ticket information extractor 230 may also convert between different representational formats such as JSON or XML. Additionally or alternatively, the chunks may also include text in natural language form, for example, generated using a language model or sentence templates as described with reference to the UI action extractor 222.

The source code extractor 232 may connect to the code repository 120 to extract information related to the source code of the legacy system to generate chunks for training the language models for the language model agents 280. For example, the source code extractor 232 may connect to a version control system (e.g., GIT, SVN, etc.). The source code extractor 232 may extract functions from the code repository 120. For example, the source code extractor 232 may include instructions to recognize at least a portion of the syntax of the programming languages used by the legacy system. The source code extractor 232 may be able to extract individual functions from a source code file that includes multiple functions and generate a chunk for each of the functions. Functions extracted by the source code extractor 232 may also be stored in a tree or relational structure. The selection tree or relational structure may be used to provide input to selection elements of UIs of the one or more language model clients 102, for example, to select the function for which documentation for the one or more language model clients 102 is to be generated.

Chunks extracted from the source code of the code repository 120 may include standard data fields including the function name, child functions, calling functions (e.g., parent functions), variable names, input arguments, return names, function description, argument descriptions, and/or a return description. The chunks extracted by the source code extractor 232 may be in a name-value pair format (e.g., using XML, JSON, etc.), using a natural language format having the same or similar information, or both using name-value pairs and/or natural language.

In some embodiments, the source code extractor 232 is configured to execute code from the code repository 120. For example, the code repository 120 may include a number of test cases. The source code extractor 232 may execute the test cases and generate information and/or statistics related to the execution of the functions. For example, the source code extractor 232 may determine how many times a function is called, how many times a line of code is called, the total execution time of a particular test case and/or a function within the test case. The source code extractor 232 may generate chunks related to the statistics for a test case, for example, as a different chunk type and with different information than those related to the functions. The source code extractor 232 may generate chunks related to the test cases that include the statistics and/or additional metadata including the description of the test and the test name. In some embodiments, the source code extractor 232 generates statistics related to the execution of functions called during the test cases in the chunk for the particular function.

In some embodiments, the source code extractor 232 recursively extracts functions from the source code. The source code extractor 232 may determine that a second function call is present within the body of a first function and generate chunks for the second function as well. The source code extractor 232 may store the relationship between the first function and the second function. For example, the source code extractor 232 may store a child/parent relationship, a caller/callee relationship, or any other relationship indicating the structure between two or more functions. During extraction from the first function, the source code extractor 232 may store a list of functions it has encountered. The list may be used to generate a data structure indicating the relationship between two or more functions and/or used to direct the source code extractor 232 to the next function to extract. The data structure storing the relationship may be included in the chunk or chunks extracted for the first function. In some embodiments, the chunks extracted for two functions having a relationship between them are combined into another chunk. The combined chunk and/or the original chunks may be used during training of the language models for the language model agents 280.

In some embodiments, the source code extractor 232 encounter a function call for a second function that is part of another code library while generating chunks for a first function. The source code extractor 232 may search other repositories identified by the legacy system data scraper 210 for the second function. If the source code extractor 232 finds the second function in another repository, the source code extractor 232 may additionally add the name, URL, etc. of the repository in the chunk. The language models may learn relationships between different repositories using this information. For example, the language models may be able to provide statistics related to the frequency that a library is used within a function or within another repository. Advantageously, the language models may be used to determine a suggested order or plan for upgrading different components of a legacy system.

In some embodiments, the source code extractor 232 may encounter a function call for a second function that is part of another code library while generating chunks for a first function. The source code extractor 232 may determine the programming language for the second function and add the programming language of the second function in a chunk for the first function. For example, the source code extractor 232 may store the programming language with the relationship between the first function and the second function. The language models may learn relationships between different programming languages using this information. For example, the language models may be able to provide statistics related to the frequency that a programming language is used within functions written in another programming language. Advantageously, the language models may be used to determine a suggested order or a plan for upgrading different components of a legacy system (e.g., that are written in different languages). The source code extractor 232 may also generate chunks including the actual source code of the legacy system. For example, the chunks may be split by file and/or by function.

Language models may be trained with the chunks generated by the source code extractor 232. The language models may learn correlations between function calls, test description and function description, variable names, etc. and generate insights in response to user prompts. The language models may also be trained using the specific source code allowing the language model to provide example code, coding suggestions, etc. following the general practice of the one or more legacy systems 104 and using proper syntax for the programming language used. The language models trained with the chunks extracted by the source code extractor 232 may be used by the one or more language model clients 102 to generate documentation, generate code, and/or answer general technical support questions related to the legacy system.

One purpose of the chunks extracted by the extractors 222-232 is to train language models using data gathered from a particular legacy system for which the language model will be used to respond to prompts. Advantageously, the extractors 222-232 of the index generator 220 generate chunks for training sets with particular information and in a particular format such that the language model can recognize correlations within the one or more legacy systems 104 and provide insights to the developers either by generating code, documentation, and/or answering general technical support questions with information that general language models would not have.

The language model trainer 240 may be configured to train one or more language models for a legacy system of the one or more legacy systems 104. The language model may be trained using chunks generated by the extractors 222-232 of the index generator 220 and stored in the chunks 172 of the one or more indexed storages 160. The parameters of the resultant trained language model may be included in an agent, for example, of the one or more language model agents 280. In some embodiments, one or more language model agents 280 include a specific form of the language model that is to be used for the legacy system. The language model trainer 240 may request the form from the language model agents 280 for training. The training may be performed within the language model trainer 240, for example, using a copy of the language model architecture. Additionally or alternatively, the language model trainer 240 may train the language model in the agent through a series of interactions. The interactions may include providing a number of predictions to perform (e.g., next word predictions), receiving the prediction, and providing parameter changes to the agent for the language model.

The language model trainer 240 may generate a training set for a particular training pass from the chunks extracted by the extractors 222-232. The language model trainer 240 may select the chunks of the training set based on one or more criteria. For example, the language model trainer 240 may generate a training set using chunks from a particular legacy system, chunks related to a particular technology or programming language, chunks of a particular type, etc. This allows the language model agents 280 to include multiple language models from which the most appropriate may be chosen.

The language model trainer 240 is shown to include one or more optimizers 242 and one or more loss functions 244. The one or more loss functions 244 may be used to evaluate the performance of a language model during training. The one or more loss functions 244 may be selected based on the desired functionality of the language model being trained. For example, a loss function that includes a similarity component between chunks known to have similar semantic meaning and/or a dissimilarity component between chunks known to have dissimilar semantic meaning may be selected to provide enhanced semantic meaning. Additionally or alternatively, a cross-entropy loss may be selected from the one or more loss functions 244. The language model trainer 240 may reduce a cross-entropy loss between the predictions of a next word from the language model and the actual next word in the training set.

The language model trainer 240 may use an optimizer of the one or more optimizers 242 to perform training. The optimizer may be selected from the one or more optimizers 242 based on performance for a particular loss function. The one or more optimizers 242 may include stochastic gradient descent and different variations thereof (e.g., mini-batch gradient descent, adaptive moment estimation, etc.). The optimizer may evaluate the loss function for a number of training inputs. For example, the optimizer may compare next word predictions with the actual next word in the training set. The optimizer may calculate the loss for a number of evaluations (e.g., a batch, mini-batch, etc.) and calculate a gradient of the loss with respect to the parameters of the language model. For example, the optimizer may perform backpropagation by applying the chain rule to calculate the derivative of the loss with respect to the parameters of the language model. The optimizer may determine an adjustment to the parameters and/or new adjusted parameters and provide the adjustments or the parameters to the language model being trained. The optimizer may execute until a training criterion is met. For example, a threshold loss, a rate of change of the loss per batch of training, a total number of batches performed, etc. The optimizer may thereby reduce the loss function by adjusting the parameters of the language model.

After training is complete, the agent of the language model agents 280 may be provided with the trained parameters. The agent may be available to respond to various prompts from the one or more language model clients 102 for the trained language model.

An agent of the language model agents 280 has a language model having several layers and/or inputs according to some embodiments. The input of the language model may include a number of previous words of text and a type input 282. The type input 282 may be a single bit that indicates to the network if the output should be code or natural language. The type input 282 allows the same language model to be trained using both chunks of a natural language and chunks having code and to use correlations learned from one chunk type to help while responding to prompts for the other output type. In some embodiments, the language model has a number of interconnected layers to produce the final output (e.g., next word prediction). For example, the one or more language model agents 280 of FIG. 2 are shown to have a tokenizer 284 (e.g., a tokenization layer), an embedder 286 (e.g., an embedding layer), a transformer 288 (e.g., a transformer layer), and output layers 290. A particular language model may have any number of the layer types described and/or additional layers.

The tokenizer 284 may be configured to convert text-based words into tokens. A token may represent more than one word (e.g., compound phrases), a single word, and/or word components (e.g., prefixes, suffixes, etc.). The tokens may be represented by numerical vectors upon which the other layers of the language model can operate. The tokens may be high dimensional vectors. In some embodiments, the token vectors may be sparse. For example, one-hot encoding may be used where the dimensionality of the token vectors is equal to the dictionary of words and/or word components (e.g., from the chunk training set). A value of one may be entered for in the position corresponding to the particular word or word component being tokenized.

The embedder 286 may be configured to convert the tokens (e.g., high-dimensional and sparse vectors) into word embeddings (e.g., of a lower dimension). The output of the embedder may include a numerical vector in which different directions represent different semantic meanings. For example, word embeddings exiting the embedder 286 having a small cosine distance may represent words having similar meaning.

In some embodiments, the embedder 286 is represented by a matrix which is multiplied by the vector output from the tokenizer 284. The matrix may be rectangular such that as the multiplication is performed the dimensionality of the resulting vector embedding is reduced compared to that of the token vector. During training the elements of the matrix may be adjusted such that the embedder 286 generates embedding vectors indicative of the sematic meaning of the word and/or words. By training the language model and thus the embedder 286 using a training set of chunks for a particular legacy system, the core agent management system 200 can generate an embedder 286 to generate embeddings specifically tuned for the vocabulary, lexicon, and semantics used by a particular legacy system of the one or more legacy systems 104 and/or a technology used by the one or more legacy systems 104.

The embedder 286 may serve more than one purpose in the core agent management system 200. The embedder 286 may act as a layer within the language model of the language model agents 280, for example, to embed words while generating the response to a prompt. In addition, the embedder 286 may be used for retrieval augmentation. For the purposes of retrieval augmentation, the embedder 286 (e.g., the embedding layer or layers) may be used to generate an index for each chunk generated by the index generator 220. The index can be used to rapidly and efficiently search for relevant chunks that can be provided to the language model for additional context while responding to a prompt. For example, the vector reader 250 may also use the embedder 286 to generate a vector embedding of the prompt and retrieve chunks that have a vector embedding similar to that of the prompt.

The transformer 288 may include one or more transformer layers including a positional encoding layer, encoder layers, decoder layers, and/or an attention mechanism. The transformer 288 takes as input a sequence of vector embeddings and predicts an embedding representing the next word output. The output embedding of the transformer may be the same or different from the output embedding of the embedder 286. A positional encoding layer may add positional information (e.g., ordering) to the input words using sinusoid functions of different frequencies. These functions generate unique positional vectors that can be augmented to the embedding vector input to the transformer. The positional encoding combined with the attention mechanism may allow the transformer 288 to efficiently process all input vectors simultaneously, while maintaining sequential information by way of the positional encoding. For example, positional encoding allows the transformer 288 to recognize the difference between the phrase "The cat sat on the mat" and "The mat sat on the cat."

The encoding layer can further compress the sequence of vector embeddings (e.g., with their positional encoding) into a lower dimensional context vector or latent representation. The encoder generates an understanding of the input for the decoder layer which takes the latent representation of the encoder and generates an output.

An agent of the language model agents 280 may be configured with a language model including any of the layers described herein and having any configuration and/or multiplicity thereof. The language model may be used by the agent to provide responses to prompts with a language model that has been tuned for a particular legacy system and has been trained with a training set of text that was extracted from subsystems of the particular legacy system. Additionally, the embedder 286 of a language model may be used to generate vector embeddings for an index of the chunks. Advantageously, using the embedder 286 of a language model trained for the particular legacy system may improve retrieval accuracy because the embedder 286 is tuned to the specific vocabulary, lexicon, etc. used by the legacy system. Thus, the language model agents 280 may be provided with more relevant information from which to generate information related to a particular prompt also improving accuracy of the information that is ultimately displayed by the one or more language model clients 102.

The output layers 290 of the language model convert the embedding output of the transformer 288 to tokens and/or the actual text-based output that will be included in the response to the prompt.

In some embodiments, an agent of the language model agents 280 is configured to be deployed within a resource limited environment. The language model agents 280 and/or the language model trainer 240 may choose an efficient architecture for the language model of the agent. For example, the language model may have fewer layers and/or the language model may use lower dimensional embeddings (e.g., to reduce the overall computational complexity). In some embodiments, a first language model for a legacy system is trained to be deployed in a resource limited environment and a second language model is trained for the same legacy system to be deployed on more powerful hardware, in the cloud, etc.

After a language model has been trained the index generator 220 may generate vector embeddings that can be used as index keys to the corresponding chunks. A chunk embedder 234 may obtain a chunk from the chunks 172 of the one or more indexed storages 160 and generate a vector embedding for the chunk. The vector embedding may be stored as a key for the respective chunk in the index for the appropriate chunk type in the one or more indexed storages 160. For example, the vector embedding may be stored in action vectors 162, log vectors 164, database vectors 166, error vectors 168, or ticket vectors 170 based on the content from which the chunk was extracted.

In some embodiments, the chunk embedder 234 obtains the chunk and communicates the chunk to an agent of the language model agents 280 corresponding to the legacy system from which the chunk was obtained. The chunk embedder 234 may give the agent a job to form a vector embedding of the chunk. For example, the chunk embedder 234 may ask the agent to average the word embeddings for all the words in the chunk. Alternatively, the embedder 286 of the agent may generate an embedding for the sequence of words in the chunk.

In some embodiments, the chunk embedder 234 requests the embedder 286 or the parameters thereof and executes the embedder 286 with the chunk as input within its own environment.

The system manager 270 is configured to manage enrollment of new legacy systems and/or to initiate retraining of the language models for the language model agents 280. The system manager 270 includes a retraining initiator 272 and a new system enroller 274 in some embodiments.

The retraining initiator 272 may monitor additional content obtained by the legacy system data scraper 210. The retraining initiator 272 may initiate retraining when a new content criterion is satisfied. For example, the retraining initiator 272 may compare the amount of new content obtained to a threshold amount of new content. The new content may be measured by a number of chunks or by a number of characters, words, etc. within the chunks extracted from the additional content. Additionally or alternatively, the new content criterion may include a timeout. For example, the retraining initiator 272 may initiate retraining after a certain amount of time has elapsed (e.g., a day, a week, etc.). In some embodiments, the retraining initiator 272 may also be accessed through an API and, for example, triggered by an element of a user interface.

The retraining initiator 272 may initiate a training process that performs a specific number of adjustments to the parameters of the language models. For example, upon retraining, the language model trainer 240 may perform training for a limited number of batches. In some embodiments, the batches may be weighted more heavily towards the new information. For example, the new chunks may be included in the batches more often.

The new system enroller 274 may receive an indication that a prompt was received for a legacy system for which no information is available. The new system enroller 274 may enroll the legacy system. For example, the new system enroller 274 may configure the legacy system data scraper 210 to obtain content from the new legacy system. Additionally, the new legacy system enroller 274 may generate an indication for a UI (e.g., a developer UI) indicating that a new legacy system has been enrolled and that the new legacy system may require configuration (e.g., URLs for each of the subsystems, etc.).

The incoming task coordinator 260 may be configured to route incoming tasks (e.g., inbound, arriving, etc.) to the various agents and/or services of the core agent management system 200. The incoming task coordinator 260 may provide one or more APIs that the one or more language model clients 102 use to interact with the core agent management system 200 or generate content for the user interfaces of the one or more language model clients 102. The incoming task coordinator 260 may monitor incoming tasks on the API and direct them to the respective agent, feature, and/or service of the core agent management system 200. The incoming task coordinator 260 may coordinate the execution of multiple agents, features, and/or services as necessary based on the incoming task.

The incoming task coordinator 260 may determine whether an incoming task would benefit from retrieval augmentation. If the incoming task would not benefit from retrieval augmentation, if the benefit is small, or the incoming task coordinator 260 otherwise decides that retrieval augmentation should not be performed (e.g., system congestion, operating costs, etc.), the incoming task coordinator 260 may direct the incoming task (e.g., with an associated prompt) to an agent of the language model agents 280. If the incoming task would benefit from retrieval augmentation, the incoming task coordinator 260 may direct the incoming task to the vector reader 250 for retrieval augmentation.

The incoming task coordinator 260 may determine the specific language model (e.g., within an agent) that should be used to respond to the prompt based on the legacy system indicated by the task and/or the technology indicated by the task. In some embodiments, the API includes an input for which of the legacy systems and/or technology the task is related to. The incoming task coordinator 260 may direct the task to the specific agent or to the vector reader 250. For tasks directed to the vector reader 250 the incoming task coordinator 260 may include the specific language model that is to be used for generating a prompt embedding during retrieval augmentation.

The incoming task coordinator 260 may determine if an incoming task is directed to a legacy system that is not yet enrolled in the core agent management system 200. In some embodiments, the new legacy system is indicated by the call to the API. Additionally or alternatively, the incoming task coordinator 260 may classify an incoming task with a particular legacy system and/or technology. The incoming task coordinator 260 may generate a match score for each of the legacy systems and/or technologies already enrolled. If no match score (e.g., for any legacy system and/or technology) is greater than a threshold then the incoming task coordinator 260 may initiate enrollment of the new legacy system using the new system enroller 274. The match score may be generated using a neural network classifier and/or a language model (e.g., a generic language model and/or the language models of the language model agents 280). For example, the incoming task coordinator 260 may prompt the language model agents 280 to provide an indication of how consistent the prompt is with correlations learned during training to generate the match score.

The vector reader 250 may be configured to retrieve relevant chunks from the one or more indexed storages 160. For example, the vector reader 250 may retrieve chunks relevant to a prompt included with an incoming task and/or a request for a specific view routed by the incoming task coordinator 260. The vector reader 250 may include a search engine 252, a chunk retriever 254, and a visualization generator 256.

The search engine 252 may be configured to identify chunks relevant to a prompt. The search engine 252 may provide a semantic search for related chunks and/or a keyword search. For either type of search the search engine 252 may provide a fixed number of relevant chunks (e.g., three chunks with the highest relevancy scores) or any number of chunks that satisfy a particular relevancy criterion (e.g., search criterion, etc.). In some embodiments, the search engine 252 may use a hybrid approach using both a number of chunks and a relevancy criterion. For example, the search engine 252 may incorporate a relevancy criterion that increases its strictness (e.g., an increasing threshold, etc.) as the number of chunks that have already been included increases.

The search engine 252 may be configured to identify chunks generated from content from a particular legacy system of the one or more legacy systems 104. The legacy system may be determined by the incoming task coordinator 260 and communicated to the vector reader 250 when the task is routed for retrieval augmentation.

The search engine 252 may execute a keyword search to determine chunks that are relevant for a particular prompt. The keyword search may include counting a number of matches between a keyword and the words in a chunk. Additionally or alternatively, a chunk may have a number of keywords that are incorporated into an index to search the chunks. The search engine 252 may identify the chunks with the greatest number of keyword matches as relevant. For example, the number of keyword matches may be used as a relevancy score during a keyword search. Additionally or alternatively, the relevancy score may be based on a fraction of keywords that match the search term. In some embodiments, the search engine 252 uses a regular expression to perform the keyword search. The regular expression may provide improved results by matching different forms of the same word (e.g., different verb tenses, or singular vs. plural nouns).

The search engine 252 may execute a semantic search to determine chunks that are relevant for a particular prompt. The semantic search may include calculating a distance (e.g., Euclidean distance cosine distance) between a prompt embedding for a prompt and the embeddings in the index for each chunk. The search engine 252 may identify the chunks with the smallest distance to the prompt embedding as relevant. To perform a semantic search, the search engine 252 may generate a prompt embedding for the prompt of the incoming task. The search engine 252 may request an embedding model associated with the legacy system and/or technology corresponding to the prompt from the language model agents 280 or request the appropriate language model agent to generate the prompt embedding using its respective embedder 286. In some embodiments, the search engine 252 may use a hybrid approach that combines a keyword relevancy score with a semantic search distance to generate a hybrid relevancy score.

The chunk retriever 254 may be configured to retrieve the chunks identified as relevant by the search engine 252. The chunk retriever 254 may request the relevant chunks from one or more indexed storages 160 and provide the relevant chunks to the language model agents 280 to be used as additional information from which to respond to the prompt.

In some embodiments, the vector reader 250 includes a visualization generator 256 configured to generate information for specific views within the one or more language model clients 102. For example, the visualization generator 256 may include a view for a source code function, database column, a variable name, UI action, etc.

In some embodiments, the visualization generator 256 is configured to execute a set of instructions to generate the view. Some information of a view may be generated by recovering specific information from the content of the legacy system (e.g., from the chunks extracted from the content). For example, the information may be generated by way of a predefined search criterion for the search engine 252 and a predefined prompt for the language model agents 280. The visualization generator 256 may coordinate the retrieval of relevant chunks and the prompting of the appropriate language model agent (e.g., associated with a particular legacy system and/or technology) with the relevant chunks using the predefined prompt to extract the information for the view from the relevant chunks. Alternatively, the one or more language model clients 102 may display the information using the format of the stored chunk. The view may include a predefined search criterion to retrieve the relevant chunks. The visualization generator 256 may then directly provide the relevant chunks to the one or more language model clients 102 for display. The visualization generator 256 may provide an input to the search engine 252 to search chunks that specifically have a name-value pair format for structured display within the UI of the one or more language model clients 102.

FIGS. 3-4 show two flows of operations representing operations that may be performed by the core agent management system 200. Each of the flows of operation may illustrate all or a portion of a process for extracting information from content to form chunks, training language models specifically tuned for a legacy system of the one or more legacy systems 104 using the chunks and responding to requests from client systems using the language model with or without retrieval augmentation. FIGS. 3-4 may emphasize various aspects of some embodiments and therefore some steps (e.g., operations) may be omitted from the flow of operations, the flow of operations may start after some steps have been completed, or may end assuming some operations are performed after completing the flow of operations. In particular, FIG. 3 is related to training a language model using a specifically generated training set from various subsystems of a legacy system and generating a database of indexed chunks for retrieval augmentation; FIG. 4 is related to using the language model and the indexed chunks to respond to various queries about the legacy system.

FIG. 3 shows a flow of operations 300 for generating a tuned language model and retrieval index according to some embodiments. The flow of operations, for example, may be performed by the core agent management system 200 of the infrastructure modernization system 100. The flow of operations 300 may include obtaining content from a plurality of legacy systems in operation 302. For example, the legacy system data scraper 210 may subscribe to or poll content from the one or more legacy systems 104. Functionality described as being performed be the legacy system data scraper 210 may by performed in the operation 302.

In some embodiments, the operation 302 includes interacting with an API of the one or more legacy systems 104 or a subsystem thereof (e.g., a code repository 120, interfaces 122, etc.). The operation 302 may include performing a POST, a GET, or another appropriate API request to the legacy system. In some embodiments, a developer may provide the URL and/or the API call template (e.g., to a configuration file) prior to the operation 302. Additionally or alternatively, the flow of operations 300 may include browsing (e.g., viewing, monitoring) the local network to find or determine URLs for various subsystems of the legacy system and determine how to interact with the API.

In some embodiments the operation 302 includes subscribing to content generated by the legacy system or a subsystem thereof, polling for content from the legacy system, and/or generating listeners to monitor the subsystem and detect events that are occurring to generate (e.g., obtain) content. For example, the operation 302 may include extracting UI events/actions from the UI subsystem of the legacy system by creating a listener for the UI. The listener may respond to specific user actions such as activating a button and/or predefined keypresses and may store the key presses or button clicks that caused one or more UI callback functions to be triggered.

The flow of operations may include Generating chunks from the content by extracting data from the content, the data extracted for the chunk based on a content type of the content in the operation 304. Extracting (e.g., creating, generating, etc.) chunks from content may be performed by the index generator 220, for example, by the extractors 222-232. The data extracted (e.g., to generate a specific chunk type) may be based on the content type (e.g., the subsystem from where the content is obtained). For example, as the legacy system data scraper 210 obtains content it may route the content to the appropriate extractor to generate a chunk of the appropriate type. Each type of chunk may have a particular set of information that is included in the chunk, for example, as a name-pair or in a natural language format. For example, chunks generated by the source code extractor 232 may include a function name, input and output arguments, and/or a description (e.g., provided in a commented function header, etc.). Functionality described as being performed by any of the extractors 222-232 may be performed in the operation 304.

The flow of operations 300 may include storing the chunks in a database, the database logically separated for each of the plurality of legacy systems in operation 306. For example, the extractors 222-232 of the index generator 220 may store the extracted chunks in the one or more indexed storages 160. In some embodiments, the database is logically separated by having isolated hard disk storage (e.g., on separate hardware, on separate cloud servers, etc.) for the chunks of each legacy system. In some embodiments, the database is logically separated by storing the chunks of different legacy systems within different database tables (potentially on the same hardware). In some embodiments, the database is logically separated by storing a flag with the chunk indicating the legacy system with which it is associated (e.g., within the respective index key for each chunk). Logically separated databases for each legacy system allow for filtering and training using the appropriate chunks for a particular legacy system.

The flow of operations 300 may include training a language model, the language model including one or more embedding layers in operation 308. For example, language model trainer 240 may train the language models for the language model agents 280. A language model (e.g., used by the language model agents 280) may include several layers including a tokenization layer, one or more embedding layers, one or more transformer layers, and an output layer. The operation 308 may include training the language model by adjusting weights of the one or more layers to reduce the value of a loss function against a training set. The operation 308 may include generating the training set by selecting a particular set of chunks stored in the one or more indexed storages 160. For example, the operation 308 may include filtering the chunks based on the legacy system from which they were extracted and/or based on a technology (e.g., hardware, programming language, etc.) related to the content from which the chunk was extracted. Functionality described as being performed by any of the language model trainer 240 may be performed in the operation 308.

The flow of operations 300 may include generating a vector associated with the semantic meaning of the chunk using the embedding layer independently from other layers of the language model in the operation 310. For example, the operation 310 may be performed by the chunk embedder 234 of the index generator 220. The language model trained in the operation 308 includes an embedding layer (e.g., the embedder 286). The operation 310 may include generating a vector embedding of each chunk by processing the chunk through the embedding layer of the language model trained for the legacy system from which the chunk was extracted. Functionality described as being performed by any of the chunk embedder 234 may be performed in the operation 310. The flow of operations 300 may include storing the vector in the index as a key to the chunk in the operation 312. The vector embedding, for example, may be stored in the index of the one or more indexed storages 160.

In some embodiments, after the operation 312 is performed the language model and retrieval augmentation system are configured for the legacy systems. The language model and retrieval augmentation system may remain constant. Alternatively, as new content is obtained (e.g., via the legacy system data scraper 210) the flow of operations 300 may be repeated, for example, to refine the language model and/or add to the chunks indexed for retrieval augmentation. In some embodiments, a portion of the flow of operations 300 is repeated. For example, as new content is obtained, the chunks may be extracted and stored; however, the operation 308 may not be performed. The language model and the embedding layer generated using the initial extracted chunks may be used to index the future chunks without updating the language model. Functionality described as being performed by the system manager 270 may initiate retraining (e.g., additional operations of the operation 308 as new content is obtained.)

FIG. 4 shows a flow of operations 320 for processing a prompt using a tuned language model according to some embodiments. The flow of operations, for example, may be performed by the core agent management system 200 of the infrastructure modernization system 100. The flow of operations 320 may include receiving a prompt from a client in the operation 322. For example, the incoming task coordinator 260 may receive incoming tasks including a prompt. The operation 322 may be initiated by a client (e.g., the one or more language model clients 102) interacting with an API provided by the core agent management system 200. For example, the client may POST a task for the core agent management system 200 to complete. The operation 322 may include receiving a task from a code generation client, a document generation client, and/or a chatbot or chat interface client.

The flow of operations 320 may include determining the legacy system indicated by the prompt in operation 324. For example, the operation 324 may be performed by the incoming task coordinator 260. The flow of operations 320 may include reading the parameters of an incoming request through an API to determine the legacy system indicated by the prompt. For example, the API may include an input parameter that provides a selection of the legacy system. Additionally or alternatively, the operation 324 may include executing a neural network to determine the legacy system indicated by a prompt. The operation 324 may include executing a language model or a classification network to determine a score related to the legacy systems. Alternatively, the operation 324 may include asking (e.g., by way of a second prompt) the one or more language models to which legacy system the prompt is directed. Functionality described as being performed by the incoming task coordinator 260 may be performed in the operation 324.

The flow of operations 320 may include generating a context flag indicating whether the prompt represents a request for a natural language output or a code syntax output in operation 332. The operation 332 may also be performed by the incoming task coordinator 260. Similar to the operation 324, generating a context flag may include reading the parameters of an incoming request through an API to determine if the incoming task (e.g., inbound, arriving, etc.) provides a selection of code syntax output or natural language output. For example, the API may include an input parameter that provides the selection. Additionally or alternatively, the operation 326 may include executing a neural network to determine the context flag. The operation 326 may include executing a language model or a classification network to determine whether the prompt indicates a natural language output or a code syntax output in operation thereby generating the context flag. Functionality described as being performed by the incoming task coordinator 260 may be performed in the operation 326.

The flow of operations 320 may include determining whether generating a response to the prompt will use retrieval augmentation in operation 328. The operation 328 may also be executed by the incoming task coordinator 260. The operation 328 may be performed by many similar operations as those described with respect to the operations 324 and 326. For example, the client may provide a flag indicating if retrieval augmentation is required. Additionally or alternatively, the operation 328 may include executing a classification network and/or a language model to determine if retrieval augmentation is suggested for the prompt. At the operation 330, the flow of operations may split based on whether generating the response to the prompt will use retrieval augmentation. If the prompt will not be answered using retrieval augmentation (e.g., path "NO") the flow of operations proceeds to the operation 332. If the prompt will be answered using retrieval augmentation (e.g., path "YES") the flow of operations proceeds to the operation 334.

The flow of operations 320 may include generating a response using the language model for the legacy system indicated (e.g., as determined in the operation 304) in operation 332. For example, the incoming task coordinator 260 may route a response to a language model of the language model agents 280 and the language model agents 280 may generate a response without retrieval augmentation. Advantageously, more prompts may be accurately answered without retrieval augmentation because the language models are tuned specifically for the legacy system. Generating a response without retrieval augmentation may be less computationally intensive because the language model does not process whole chunks with the prompt.

If retrieval augmentation will be used to generate a response to the prompt, the flow of operations may include generating a vector embedding for the prompt using the embedding layer of the for the legacy system indicated in the operation 334. The operation 334 may be performed by the vector reader 250. The operation 334 may include requesting the embedding layer of the language model for the legacy system indicated. The prompt may be embedded using the embedding layer, for example, by executing the embedding layer using the prompt as input. In some embodiments, the prompt embedding may be generated by averaging the word embeddings for each of the words in the prompt. Functionality described as being performed by the search engine 252 may be performed in the operation 334.

The flow of operations 320 may include retrieving one or more relevant chunks for the prompt by comparing the vector embedding for the prompt to the vector embeddings in the index in operation 336. For example, the operation 336 may be performed by the search engine 252. The operation 336 may include generating a similarity metric or a distance metric between the prompt embedding and the vector embeddings of the chunks stored in the index (e.g., generated using flow of operations 300). For example, the cosine distance and/or the Euclidean distance may be used to evaluate the similarity of the embeddings and identify relevant chunks. In some embodiments, a fixed number of chunks may be identified as relevant. For example, the search engine 252 may identify the three chunks with an embedding that are closest (e.g., smallest distance) to the prompt embeddings. Additionally or alternatively, all chunks satisfying a similarity criterion may be identified as relevant. Evaluating the similarity criterion in the operation 336 may include comparing the similarity metric (or the distance metric) to a threshold. For example, all chunks having an embedding vector in the index that satisfy the threshold may be identified as relevant and retrieved. Functionality described as being performed by the search engine 252 and the chunk retriever 254 may be performed in the operation 336.

The flow of operations 320 may include generating a response by applying the prompt or a second prompt based on the prompt and the one or more relevant chunks as inputs to the language model of the legacy system indicated, where the language model may be based upon the context flag in the operation 338. Advantageously, by executing the flow of operations 320, language models tuned to a particular legacy system are used to both retrieve relevant information that has been extracted from content of the legacy system and its subsystems and to generate the response. The language models, being trained by training sets generated using the systems and methods described herein, are more accurate and require less processing than traditional language models.

Exemplary Embodiments

An embodiment relates to a method for generating one or more language models for one or more legacy systems. The method includes obtaining, by one or more processors, a plurality of content elements from the one or more legacy systems. The method also includes generating, by the one or more processors, a plurality of chunks by extracting data from the plurality of content elements, wherein the data extracted for a first chunk is based upon a content type for a respective content element from which the first chunk was extracted. The method also includes storing the plurality of chunks in database, wherein the database is logically separated for each of the one or more legacy systems. The method also includes training, by the one or more processors, a respective language model of the one or more language models for a corresponding legacy system of the one or more legacy systems using a set of chunks from the plurality of chunks filtered by the corresponding legacy system from which the respective content element was obtained, wherein the respective language model includes one or more embedding layers. The method also includes generating, by the one or more processors, a vector associated with a semantic meaning of a second chunk using the one or more embedding layers independently from other layers of the respective language model for the corresponding legacy system associated with the second chunk and storing the vector as a key for the second chunk in an index for the corresponding legacy system.

In some embodiments, the plurality of chunks includes a flag indicating whether a chunk of the plurality of chunks includes natural language or code.

In some embodiments, the flag is an input to the respective language model.

In some embodiments, obtaining the plurality of content elements includes adding a listener for a webserver for a user interface of the one or more legacy systems and the first chunk includes an identification at least one of: one or more user interface elements associated with an action observed by the listener or one or more user interface functions associated with the action.

In some embodiments, the action is a first action and the one or more user interface elements are associated with a second action occurring proximate in time to the first action.

In some embodiments, obtaining the plurality of content elements includes receiving log entries indicating changes to a state of the one or more legacy systems.

In some embodiments, the first chunk includes a portion of a first log entry and a portion of a second log entry, a first timestamp of the first log entry and a second time stamp of the second log entry satisfying a proximity criterion.

In some embodiments, obtaining the plurality of content elements includes receiving support tickets from the one or more legacy systems indicating an error and a resolution.

In some embodiments, training the respective language model includes combining at least two chunks of the plurality of chunks having errors or resolutions satisfying a similarity criterion.

In some embodiments, training the respective language model includes combining at least two chunks of the plurality of chunks having timestamps that satisfy a proximity threshold and are associated with different content elements.

In some embodiments, generating the plurality of chunks includes extracting a table name, a column name, a data type, and a key from a database of the one or more legacy systems.

In some embodiments, generating the plurality of chunks includes extracting, from a first function, at least one of a name of the first function written in a first programming language, parameters of the first function, a return type of the first function, a body of the first function, or a description of the first function and determining a relationship between the first function and a second function written in a second programming language.

An embodiment relates to a system for generating one or more language models for one or more legacy systems. The system includes one or more processing circuits configured to obtain a plurality of content elements from the one or more legacy systems. The one or more processing circuits are also configured to generate a plurality of chunks by extracting data from the plurality of content elements, wherein the data extracted for a first chunk is based upon a content type for a respective content element from which the first chunk was extracted. The one or more processing circuits are also configured to store the plurality of chunks in database, wherein the database is logically separated for each of the one or more legacy systems. The one or more processing circuits are also configured to train a respective language model of the one or more language models for a corresponding legacy system of the one or more legacy systems using a set of chunks from the plurality of chunks filtered by the corresponding legacy system from which the respective content element was obtained, wherein the respective language model includes one or more embedding layers. The one or more processing circuits are also config-ured to generate a vector associated with a semantic mean-ing of a second chunk using the one or more embedding layers independently from other layers of the respective language model for the corresponding legacy system asso-ciated with the second chunk and store the vector as a key for the second chunk in an index for the corresponding legacy system.

In some embodiments, obtaining the plurality of content elements includes adding a listener for a webserver for a user interface of the one or more legacy systems and the first chunk includes an identification at least one of: one or more user interface elements associated with an action observed by the listener or one or more user interface functions associated with the action.

In some embodiments, the action is a first action and the one or more user interface elements are associated with a second action occurring proximate in time to the first action.

In some embodiments, obtaining the plurality of content elements includes receiving log entries indicating changes to a state of the one or more legacy systems and the first chunk having a portion of a first log entry and a portion of a second log entry, a first timestamp of the first log entry and a second timestamp of the second log entry satisfying a proximity criterion.

In some embodiments, obtaining the plurality of content elements includes receiving support tickets from the one or more legacy systems indicating an error and a resolution and training the respective language model includes combining at least two chunks of the plurality of chunks having errors or resolutions satisfying a similarity criterion.

In some embodiments, training the respective language model includes combining at least two chunks of the plu-rality of chunks having timestamps that satisfy a proximity threshold and are associated with different content elements.

In some embodiments, generating the plurality of chunks includes extracting a name of a function, parameters of the function, a return type of the function, a body of the function, and a description of the function.

An embodiment relates to a system for generating one or more language models for one or more legacy systems, the system includes one or more processing circuits configured to operate one or more utility agents, one or more language model agents, and one or more reader agents. The one or more utility agents are configured to obtain a plurality of content elements from the one or more legacy systems using one or more technologies. The one or more utility agents are also configured to generate a plurality of chunks by extract-ing data from the plurality of content elements, wherein the data extracted for a first chunk is based upon a content type for a respective content element from which the first chunk was extracted. The one or more utility agents are also configured to store the plurality of chunks in database, wherein a chunk stored in the database are retrieved based on a legacy system filter and a technology filter. The one or more utility agents are also configured to train a first language model of the one or more language models using chunks retrieved based on selections of the legacy system filter and the technology filter, wherein the first language model including one or more embedding layers. The one or more utility agents are also configured to create one or more language model agents including a first language model agent for the first language model and generate a vector associated with a semantic meaning of a second chunk using the one or more embedding layers independently from other layers of the first language model. The one or more utility agents are also configured to assign an inbound task to an assigned language model agent including the first language model or a second language model for a legacy system indicated by a prompt of the inbound task, wherein the inbound task is generated by a client application configured to receive a response to the prompt and generate a user interface element for displaying the response. The one or more reader agents are configured to generate a prompt embedding for the prompt of the inbound task, the one or more embedding layers associated with a language model for the legacy system indicated by the prompt, retrieve one or more relevant chunk from the plurality of chunks based on a similarity metric between the prompt embedding and the plurality of chunks, and provide the one or more relevant chunks to a language model agent. The one or more lan-guage model agents are configured to receive the one or more relevant chunks and generate an output by applying the prompt or a second prompt based upon the prompt and the one or more relevant chunks using the first language model.

What is claimed is:

1. A method for generating one or more language models for one or more legacy systems, the method comprising:

obtaining, by one or more processors, a plurality of content elements from the one or more legacy systems;

generating, by the one or more processors, a plurality of chunks by extracting data from the plurality of content elements, wherein the data extracted for a first chunk is based upon a content type for a respective content element from which the first chunk was extracted;

storing the plurality of chunks in database, wherein the database is logically separated for each of the one or more legacy systems;

training, by the one or more processors, a respective language model of the one or more language models for a corresponding legacy system of the one or more legacy systems using a set of chunks from the plurality of chunks filtered by the corresponding legacy system from which the respective content element was obtained, wherein the respective language model com-prises one or more embedding layers;

generating, by the one or more processors, a vector associated with a semantic meaning of a second chunk using the one or more embedding layers independently from other layers of the respective language model for the corresponding legacy system associated with the second chunk, by processing the second chunk through an embedding layer of the respective language model that was trained using chunks for the corresponding legacy system, independently from other layers of that language model;

storing the vector as a key for the second chunk in an index for the corresponding legacy system;

receiving a prompt associated with the corresponding legacy system;

generating a prompt embedding for the prompt using the embedding layer of the respective language model that was trained using chunks for the corresponding legacy system; and retrieving one or more relevant chunks from the index based on a similarity metric between the prompt embedding and the vectors stored as keys in the index for the corresponding legacy system.

2. The method of claim 1, wherein the plurality of chunks comprises a flag indicating whether a chunk of the plurality of chunks includes natural language or code.

3. The method of claim 2, wherein the flag is an input to the respective language model.

4. The method of claim 1, wherein:

obtaining the plurality of content elements comprises adding a listener for a webserver for a user interface of the one or more legacy systems; and the first chunk comprises an identification at least one of:

one or more user interface elements associated with an action observed by the listener; or one or more user interface functions associated with the action.

5. The method of claim 4, wherein the action is a first action and the one or more user interface elements are associated with a second action occurring proximate in time to the first action.

6. The method of claim 1, wherein obtaining the plurality of content elements comprises receiving log entries indicating changes to a state of the one or more legacy systems.

7. The method of claim 6, wherein the first chunk comprises a portion of a first log entry and a portion of a second log entry, a first timestamp of the first log entry and a second timestamp of the second log entry satisfying a proximity criterion.

8. The method of claim 1, wherein obtaining the plurality of content elements comprises receiving support tickets from the one or more legacy systems indicating an error and a resolution.

9. The method of claim 8, wherein training the respective language model comprises combining at least two chunks of the plurality of chunks having errors or resolutions satisfying a similarity criterion.

10. The method of claim 1, wherein training the respective language model comprises combining at least two chunks of the plurality of chunks having timestamps that satisfy a proximity threshold and are associated with different content elements.

11. The method of claim 1, wherein generating the plurality of chunks comprises extracting a table name, a column name, a data type, and a key from a database of the one or more legacy systems.

12. The method of claim 1, wherein generating the plurality of chunks comprises extracting, from a first function, at least one of a name of the first function written in a first programming language, parameters of the first function, a return type of the first function, a body of the first function, or a description of the first function and determining a relationship between the first function and a second function written in a second programming language.

13. A system for generating one or more language models for one or more legacy systems, the system comprising one or more processing circuits configured to:

obtain a plurality of content elements from the one or more legacy systems;

generate a plurality of chunks by extracting data from the plurality of content elements, wherein the data extracted for a first chunk is based upon a content type for a respective content element from which the first chunk was extracted;

store the plurality of chunks in database, wherein the database is logically separated for each of the one or more legacy systems;

train a respective language model of the one or more language models for a corresponding legacy system of the one or more legacy systems using a set of chunks from the plurality of chunks filtered by the corresponding legacy system from which the respective content element was obtained, wherein the respective language model comprises one or more embedding layers;

generate a vector associated with a semantic meaning of a second chunk using the one or more embedding layers independently from other layers of the respective language model for the corresponding legacy system associated with the second chunk, by processing the second chunk through an embedding layer of the respective language model that was trained using chunks for the corresponding legacy system, independently from other layers of that language model;

store the vector as a key for the second chunk in an index for the corresponding legacy system;

receive a prompt associated with the corresponding legacy system;

generate a prompt embedding for the prompt using the embedding layer of the respective language model that was trained using chunks for the corresponding legacy system; and retrieve one or more relevant chunks from the index based on a similarity metric between the prompt embedding and the vectors stored as keys in the index for the corresponding legacy system.

14. The system of claim 13, wherein:

obtaining the plurality of content elements comprises adding a listener for a webserver for a user interface of the one or more legacy systems; and the first chunk comprises an identification at least one of:

one or more user interface elements associated with an action observed by the listener; or one or more user interface functions associated with the action.

15. The system of claim 14, wherein the action is a first action and the one or more user interface elements or the one or more user interface elements are associated with a second action occurring proximate in time to the first action.

16. The system of claim 13, wherein:

obtaining the plurality of content elements comprises receiving log entries indicating changes to a state of the one or more legacy systems; and the first chunk comprises a portion of a first log entry and a portion of a second log entry, a first timestamp of the first log entry and a second timestamp of the second log entry satisfying a proximity criterion.

17. The system of claim 13, wherein:

obtaining the plurality of content elements comprises receiving support tickets from the one or more legacy systems indicating an error and a resolution; and training the respective language model comprises combining at least two chunks of the plurality of chunks having errors or resolutions satisfying a similarity criterion.

18. The system of claim 13, wherein training the respective language model comprises combining at least two chunks of the plurality of chunks having timestamps that satisfy a proximity threshold and are associated with different content elements.

19. The system of claim 13, wherein generating the plurality of chunks comprises extracting a name of a function, parameters of the function, a return type of the function, a body of the function, and a description of the function.

20. A system for generating one or more language models for one or more legacy systems, the system comprising one or more processing circuits configured to:

operate one or more utility agents configured to:

obtain, by one or more processors, a plurality of content elements from the one or more legacy systems using one or more technologies;

generate, by the one or more processors, a plurality of chunks by extracting data from the plurality of content elements, wherein the data extracted for a first chunk is based upon a content type for a respective content element from which the first chunk was extracted;

store the plurality of chunks in database, wherein a chunk stored in the database are retrieved based on a legacy system filter and a technology filter;

train, by the one or more processors, a first language model of the one or more language models using chunks retrieved based on selections of the legacy system filter and the technology filter, wherein the first language model comprises one or more embedding layers;

create one or more language model agents comprising a first language model agent for the first language model;

generate, by the one or more processors, a vector associated with a semantic meaning of a second chunk using the one or more embedding layers independently from other layers of the first language model; and assign an inbound task to an assigned language model agent comprising the first language model or a second language model for a legacy system indicated by a prompt of the inbound task, wherein the inbound task is generated by a client application configured to receive a response to the prompt and generate a user interface element for displaying the response;

operate one or more reader agents configured to:

generate a prompt embedding for the prompt of the inbound task, the one or more embedding layers associated with a language model for the legacy system indicated by the prompt;

retrieve one or more relevant chunks from the plurality of chunks based on a similarity metric between the prompt embedding and the plurality of chunks; and provide the one or more relevant chunks to a language model agent; and operate the one or more language model agents configured to:

receive the one or more relevant chunks; and generate an output by applying the prompt or a second prompt based upon the prompt and the one or more relevant chunks using the first language model.

* * * * *